United States Patent
Lilly et al.

(10) Patent No.: US 10,953,407 B2
(45) Date of Patent: Mar. 23, 2021

(54) WIND TURBINE BLADE RECYCLING

(71) Applicant: GFSI GROUP LLC, Bothell, WA (US)

(72) Inventors: Don Lilly, Bothell, WA (US); Ronald Albrecht, Bothell, WA (US)

(73) Assignee: GFSI GROUP LLC, Bothell, WA (US)

( * ) Notice: Subject to any disclaimer, the term of this patent is extended or adjusted under 35 U.S.C. 154(b) by 238 days.

(21) Appl. No.: 16/177,042

(22) Filed: Oct. 31, 2018

(65) Prior Publication Data

US 2019/0066062 A1 Feb. 28, 2019

Related U.S. Application Data

(63) Continuation of application No. PCT/US2018/022053, filed on Mar. 12, 2018.
(Continued)

(51) Int. Cl.
*B02C 23/38* (2006.01)
*B29B 17/04* (2006.01)
(Continued)

(52) U.S. Cl.
CPC .............. *B02C 23/38* (2013.01); *B02C 25/00* (2013.01); *B09B 3/00* (2013.01); *B29B 17/0412* (2013.01);
(Continued)

(58) Field of Classification Search
CPC ........... B02C 23/38; B02C 25/00; B09B 3/00; G06Q 10/00; G06Q 10/08; G06Q 10/0833; G06Q 10/30
See application file for complete search history.

(56) References Cited

U.S. PATENT DOCUMENTS

| 4,915,000 A | 4/1990 | MacFarlane |
| 5,375,775 A | 12/1994 | Keller et al. |

(Continued)

FOREIGN PATENT DOCUMENTS

| CN | 101000040 A | 7/2007 |
| CN | 101449142 A | 6/2009 |

(Continued)

OTHER PUBLICATIONS

International Search Report and Written Opinion dated Jun. 1, 2018, issued in corresponding Application No. PCT/US2018/022053, filed Mar. 12, 2018, 11 pages.
(Continued)

*Primary Examiner* — Faye Francis
(74) *Attorney, Agent, or Firm* — Christensen O'Connor Johnson Kindness PLLC

(57) ABSTRACT

Generally described, the methods disclosed herein for recycling fiber composite source objects, such as wind turbine blades, include converting a whole wind turbine blade to an output material state that is useful for manufacturing other products, such as those used in construction of buildings, packaging, raw materials, and pellets, among other products. The recycling process is performed while tracking the progress and location of each wind turbine blade such that the direct source of the output material may be determined. In some embodiments, the method includes sectioning the wind turbine blades, crushing the wind turbine blade sections, tracking the progress of each blade through the process, and loading output materials into a suitable transportation vessel. Correlating each wind turbine blade to a quantity of output material provides several advantages, including various certifications of the material for uses with restricted or otherwise controlled products and materials, cost savings, and other advantages.

11 Claims, 17 Drawing Sheets

Related U.S. Application Data

(60) Provisional application No. 62/524,335, filed on Jun. 23, 2017, provisional application No. 62/469,847, filed on Mar. 10, 2017.

(51) Int. Cl.

| | | |
|---|---|---|
| *B09B 3/00* | (2006.01) | |
| *C08J 11/00* | (2006.01) | |
| *G06Q 10/08* | (2012.01) | |
| *G06Q 10/00* | (2012.01) | |
| *B02C 25/00* | (2006.01) | |
| *G06K 7/10* | (2006.01) | |
| *G06Q 50/04* | (2012.01) | |

(52) U.S. Cl.
CPC ........... *C08J 11/00* (2013.01); *G06K 7/10366* (2013.01); *G06Q 10/00* (2013.01); *G06Q 10/08* (2013.01); *G06Q 10/0833* (2013.01); *G06Q 10/30* (2013.01); *G06Q 50/04* (2013.01); *B02C 2201/00* (2013.01); *B29B 2017/0468* (2013.01); *Y02W 30/52* (2015.05); *Y02W 30/62* (2015.05)

(56) References Cited

U.S. PATENT DOCUMENTS

| | | | |
|---|---|---|---|
| 9,028,731 | B2 | 5/2015 | Weyant et al. |
| 2004/0173239 | A1* | 9/2004 | Grove-Nielsen ....... C10B 53/07 134/2 |
| 2007/0017255 | A1* | 1/2007 | Grove-Nielsen ....... B29B 17/04 65/482 |
| 2007/0251601 | A1 | 11/2007 | Stager |
| 2009/0321511 | A1 | 12/2009 | Browne |
| 2011/0173127 | A1* | 7/2011 | Ho ....................... G05B 19/418 705/317 |
| 2012/0318898 | A1 | 12/2012 | Higginson et al. |
| 2014/0012764 | A1 | 1/2014 | Kruglick |
| 2015/0225529 | A1 | 8/2015 | Weyant et al. |
| 2015/0324760 | A1 | 11/2015 | Borowski et al. |
| 2017/0008671 | A1 | 1/2017 | Whitman et al. |
| 2020/0018283 | A1* | 1/2020 | Bozsak ................. F03D 1/0675 |
| 2020/0061725 | A1* | 2/2020 | Lilly ....................... F03D 80/00 |

FOREIGN PATENT DOCUMENTS

| | | | |
|---|---|---|---|
| CN | 101725472 | A | 6/2010 |
| CN | 102124237 | A | 7/2011 |
| CN | 102536663 | A | 7/2012 |
| CN | 102782311 | A | 11/2012 |
| CN | 105069495 | A | 11/2015 |
| CN | 106255825 | A | 12/2016 |
| DE | 20 2015 003 559 | U1 | 6/2015 |
| DE | 10 2015 112 844 | A1 | 9/2016 |
| DE | 20 2016 007 746 | U1 | 2/2017 |
| EP | 1605394 | A2 | 12/2005 |
| KR | 10-2012-0011195 | A1 | 2/2012 |
| WO | 2007112577 | A1 | 10/2007 |

OTHER PUBLICATIONS

Extended European Search Report dated May 22, 2019, issued in corresponding European Application No. 18726304.1, filed Mar. 12, 2018, 10 pages.

International Preliminary Report on Patentability dated Sep. 19, 2019, issued in corresponding International Application No. PCT/US2018/022053, filed Mar. 12, 2018, 10 pages.

International Preliminary Report on Patentability dated Oct. 3, 2019, issued in corresponding International Application No. PCT/US2018/024131, filed Mar. 23, 2018, 7 pages.

International Search Report and Written Opinion, dated Jul. 5, 2018, issued in corresponding International Application No. PCT/US2018/024131, filed Mar. 23, 2018, 9 pages.

Machine Translation of First Chinese Office Action, dated Mar. 11, 2020, issued in corresponding Chinese Application No. 201880000778.9, filed Mar. 12, 2018, 11 pages.

Communication pursuant to Article 94(3) EPC, dated Jul. 16, 2020, issued in corresponding European Application No. 18726304.1, filed Mar. 12, 2018, 10 pages.

* cited by examiner

Blade Table

| tower | Serial number Blade | date cut | orgin facility | blade weight in pounds | date moved to storage yard | which yard | RFID # blade: 28 bits organization | RFID # blade: 24 bits object class (kind of product) | RFID # blade: 36 bits serial number |
|---|---|---|---|---|---|---|---|---|---|
| L-72 | 032-m79 | 3/27/2017 | Callahan Divide | 28227 | 3/28/2017 | sweetwater, TX | assigned to GFS | | |

Bag Table

| Transport bag # | Transport truck | RFID # bag: 28 bits organization | RFID # bag: 24 bits object class (kind of bag) | RFID # bag: 36 bits serial number | date at processing facility | which processing facility |
|---|---|---|---|---|---|---|
| | | assigned to GFS | | | | |

Product Table

| date at product manufacturing | what product (1 row per item) | serial number product | product weight total | product weight recycled material | RFID # product: 28 bits organization | RFID # product: 24 bits object class (class of end product) | RFID # product: 36 bits serial number |
|---|---|---|---|---|---|---|---|
| | | | | | assigned to GFS | | |

*FIG. 7*

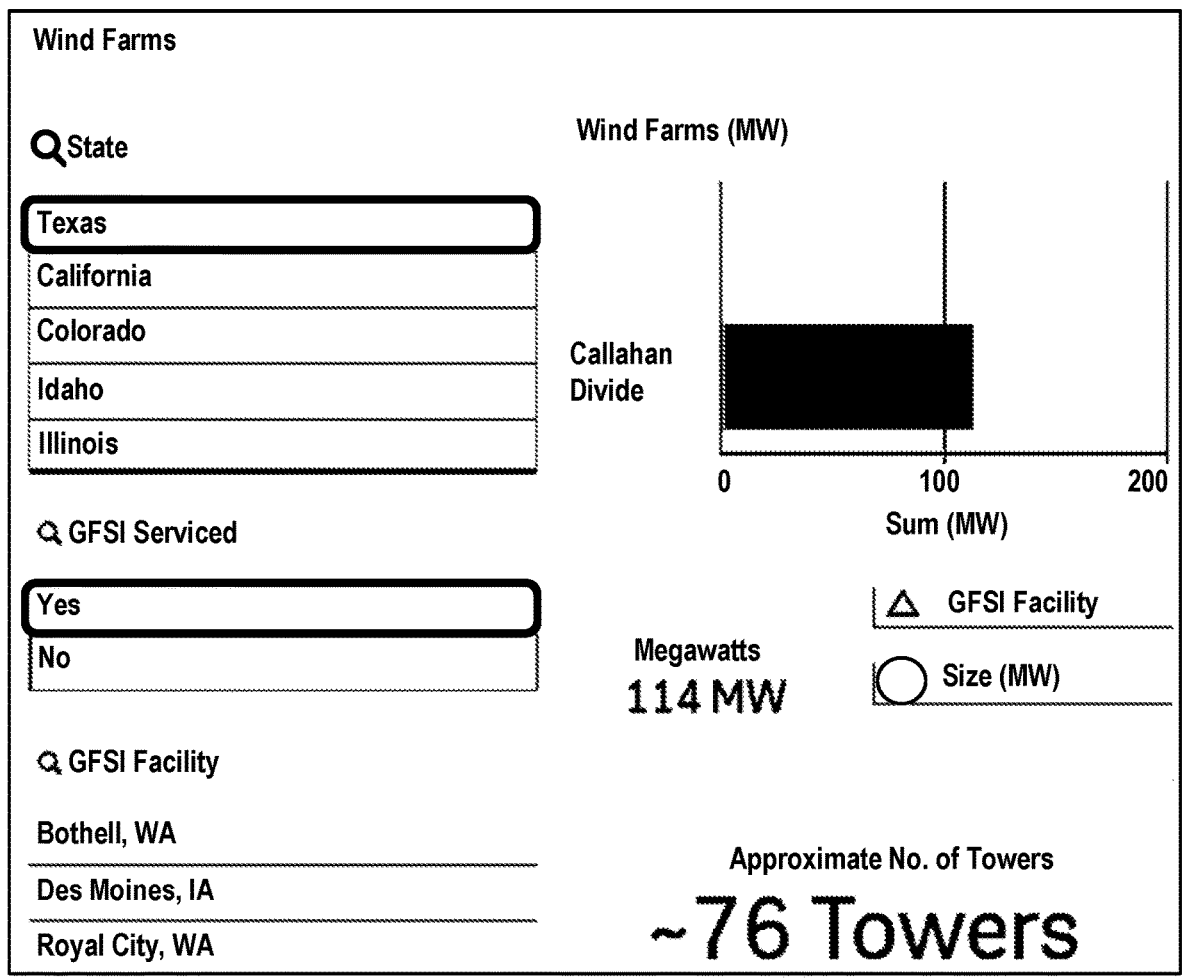
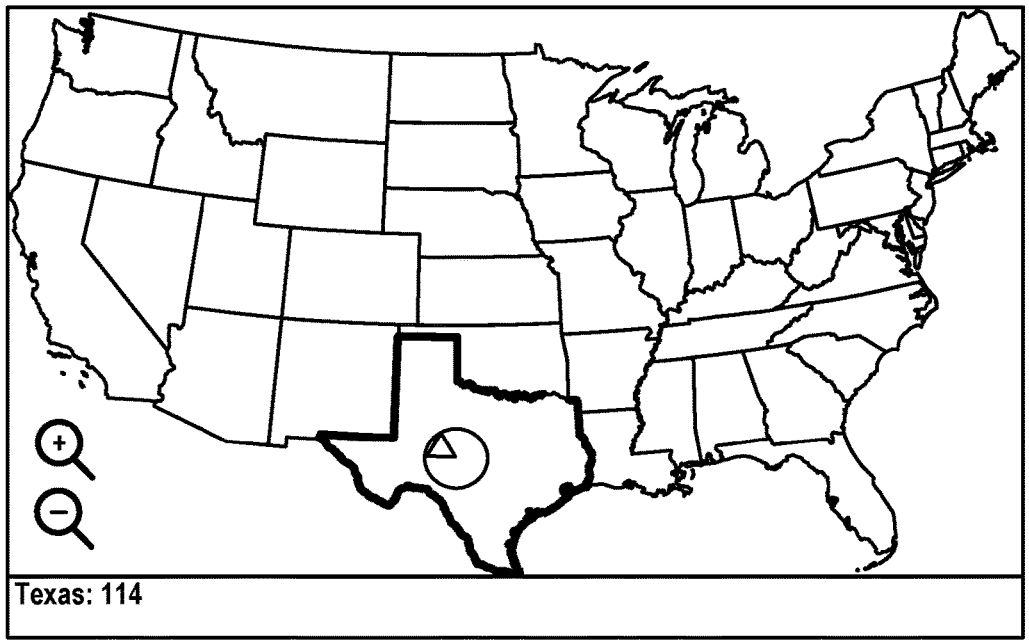
FIG. 9

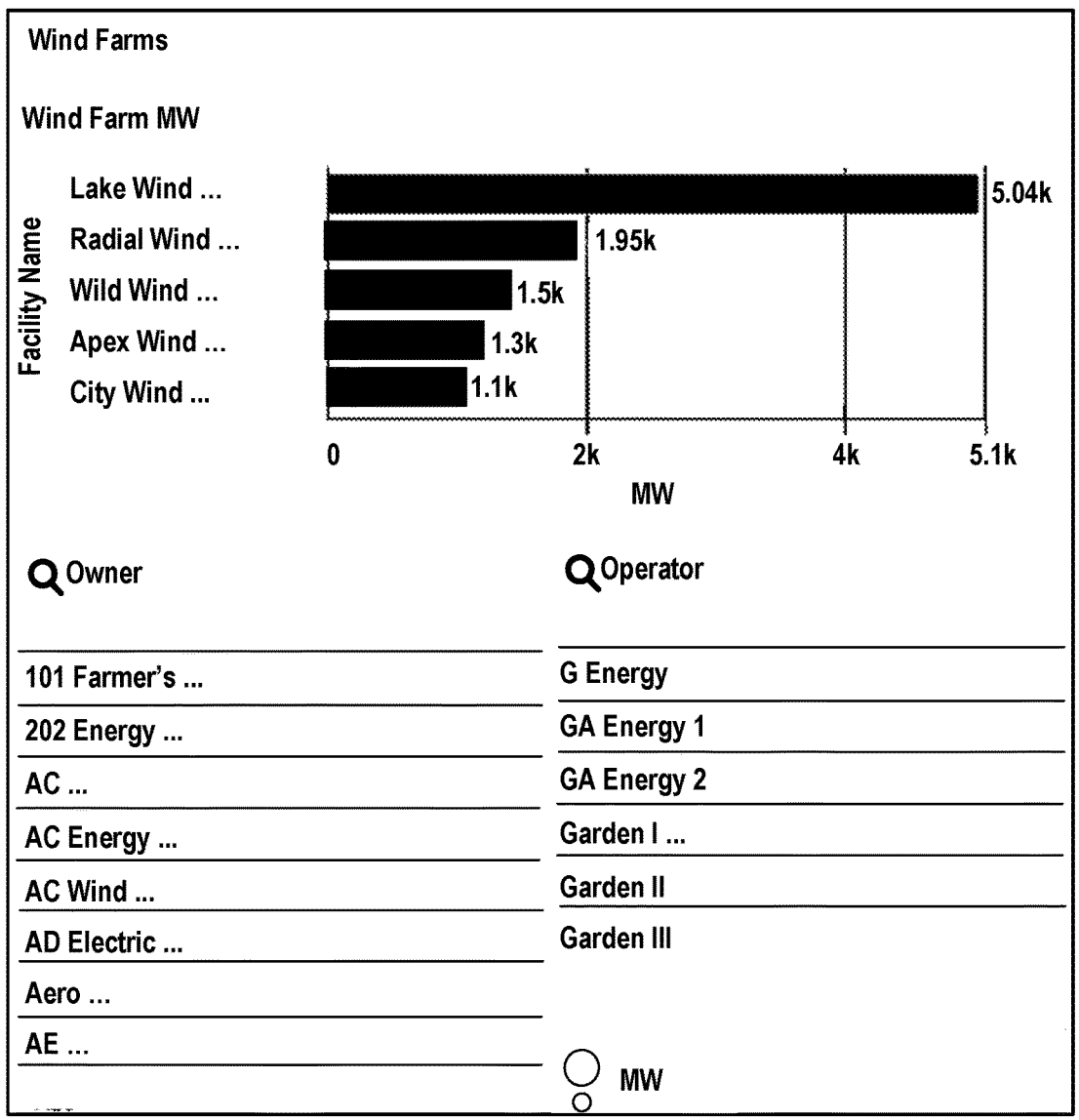
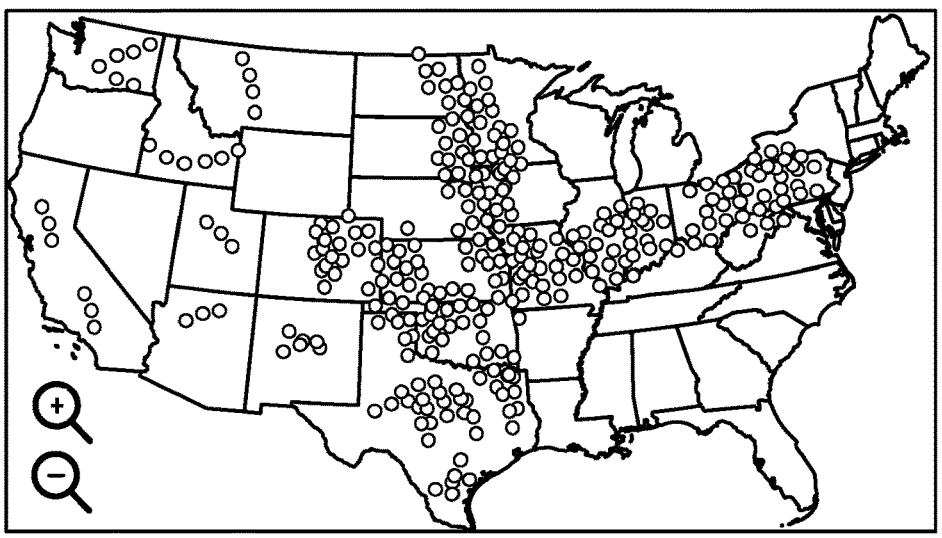
*FIG. 10*

Callahan Divide Blade Status

🔍 GFSI Field Work Completed?

No
_____

Yes
_____

| Serial # 🔍 | Tower 🔍 | Cut 🔍 | Moved 🔍 | Status 🔍 |
|---|---|---|---|---|
| 144-12 set 044 | L-72 | 1/13/2017 | 2/7/2017 | at processing facility |
| 145-11 set 044 | L-72 | 1/13/2017 | 2/7/2017 | at processing facility |
| 143-11 set 044 | L-72 | 1/13/2017 | 2/7/2017 | at processing facility |
| 0139-LM37 | L-75 | 1/23/2017 | 2/4/2017 | at processing facility |
| 0231-LM37 | L-75 | 1/23/2017 | 2/4/2017 | at processing facility |
| 0241-LM37 | L-75 | 1/23/2017 | 2/4/2017 | at processing facility |
| 37c 112 set 031 | L-71 | 1/23/2017 | 2/8/2017 | at processing facility |
| 37c 108 set 031 | L-71 | 1/23/2017 | 2/8/2017 | at processing facility |
| 37c 036 set 031 | L-71 | 1/23/2017 | 2/8/2017 | at processing facility |
| 0111-LM37 | L-74 | 1/24/2017 | 2/6/2017 | at processing facility |

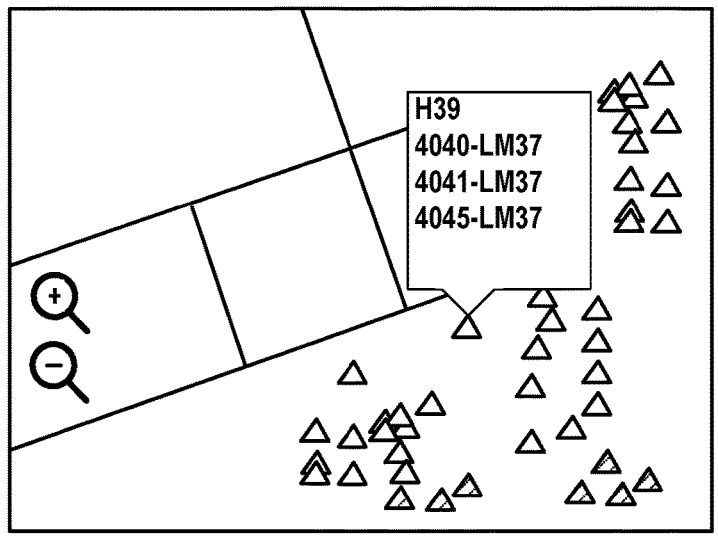

*FIG. 11*

Callahan Divide Towers

🔍 GFSI Field Work Completed?

| Yes ✓ |
|---|
| No |

Towers and Blade Serial Numbers

| Tower 🔍 | Serial Numbers 🔍 |
|---|---|
| E-23 △ | 37c 092 set 023, 37c 093 set 023, 37c 098 set 023 |
| F-25 | 37c 038 set 025, 37c 097 set 025, 37c 098 set 025 |
| E-22 | 37c 060 set 011, 37c 083 set 011, 37c 086 set 011 |
| E-24 | 37c 002 set 027, 37c 009 set 027, 37c 105 set 027 |

Certificate of Green Recycling
Wind Turbine Blades
ABC Windfarm
Transport/Recycling Section A: Generator Information Section B: Materials Received for Processing Certification/Property Title This certifies that the following blades will be utililized as recycled fiberglass and in the production of environmentally friendly, recycled . . .

Section B: 218 Wind Turbine Blades

| TOWER | Serial # |
|---|---|
| L-72 | 144-12 set 044 |
| L-72 | 145-11 set 044 |
| L-72 | 143-11 set 044 |
| L-75 | 0139-LM37 |
| L-75 | 0231-LM37 |
| L-75 | 0241-LM37 |
| L-71 | 37c 112 set 031 |
| L-71 | 37c 108 set 031 |
| L-71 | 37c 036 set 031 |
| L-74 | 0111-LM37 |
| L-74 | 0339-LM37 |
| L-74 | 0064-LM37 |
| L-69 | BR37c 013 set 016 |
| L-69 | BR37c 022 set 016 |
| L-69 | BR37c 034 set 016 |
| J-60 | 37c 104 set 029 |

*FIG. 15*

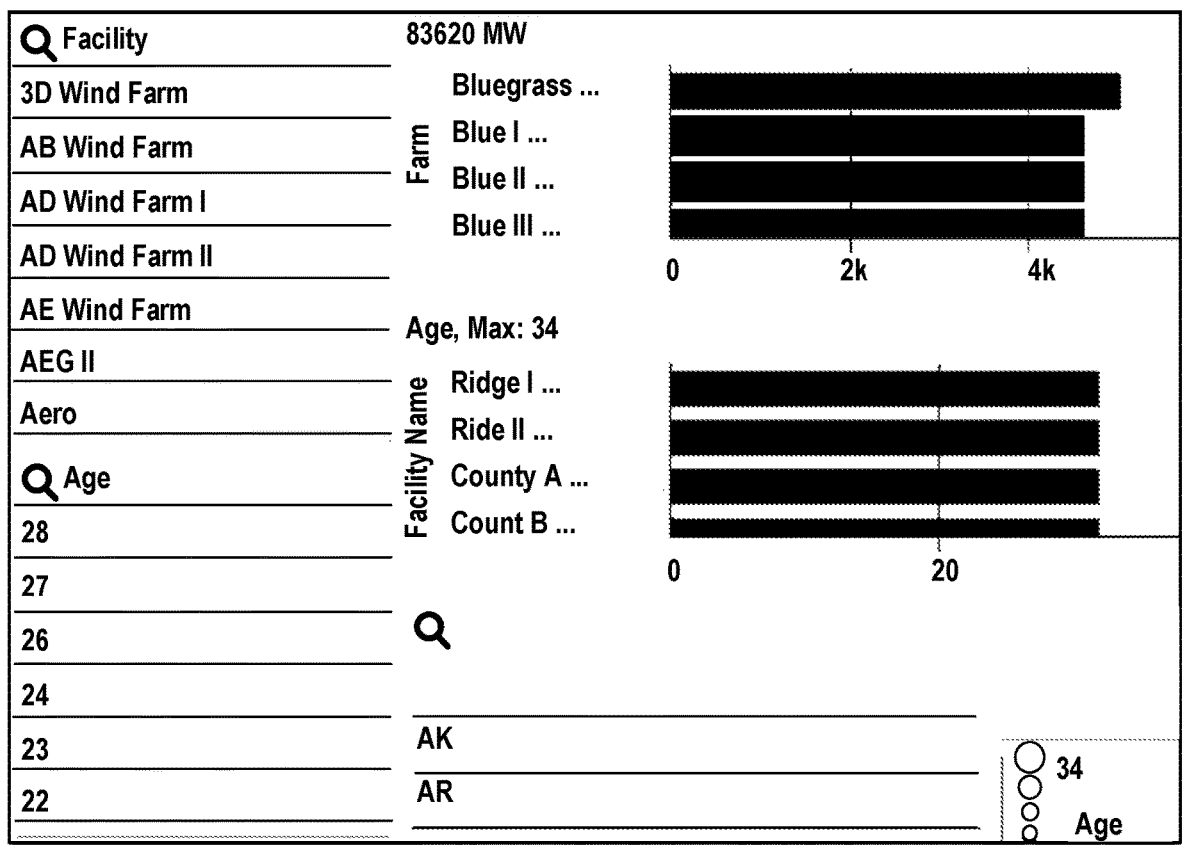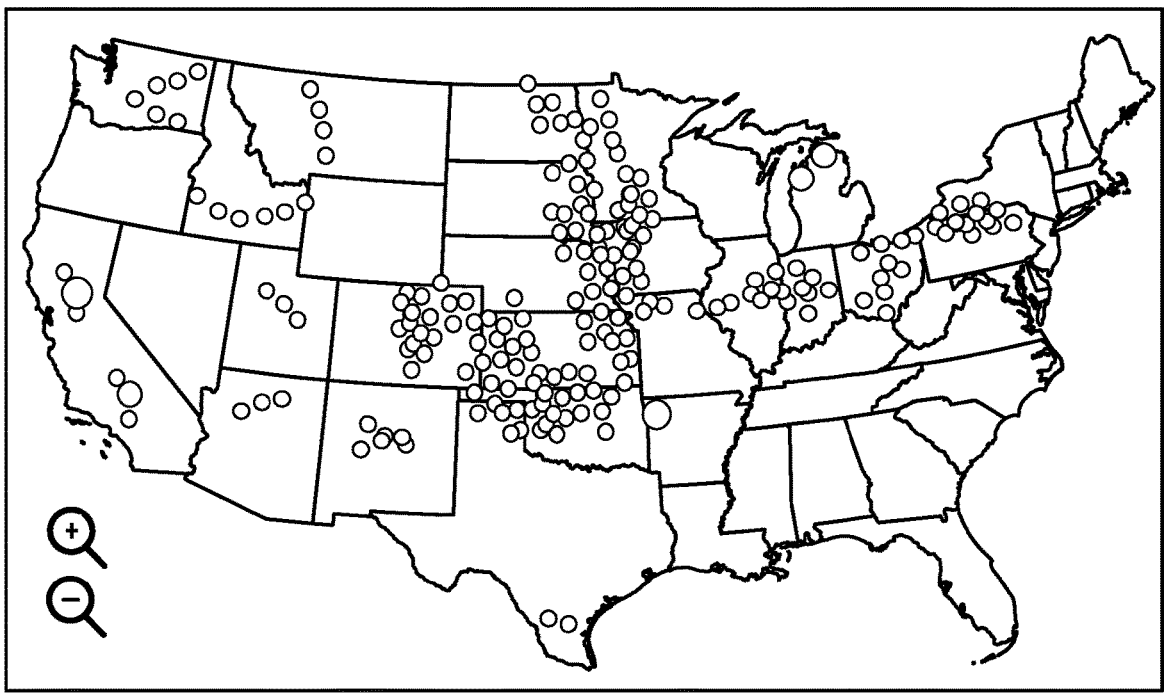
FIG. 16

WIND TURBINE BLADE RECYCLING

CROSS-REFERENCES TO RELATED APPLICATIONS

This application is a continuation of International Application No. PCT/US2018/022053, filed Mar. 12, 2018, which claims the benefit of U.S. Provisional Application No. 62/524,335, filed Jun. 23, 2017, and U.S. Provisional Application No. 62/469,847, filed Mar. 10, 2017, the disclosures of which are hereby expressly incorporated by reference herein in their entirety.

BACKGROUND

Wind energy, and more specifically the use of wind turbines to generate electricity, is an exploding market. There are many companies producing blades for this growing number of turbines, and these blades need to be periodically replaced if they wear out or become damaged. This generates a problem for blade manufacturers, utilities, and other entities that may wish to keep decommissioned blades out of landfills. Although the prospect of recycling wind turbine blades may be attractive and consistent with the notion of wind energy as a "green" power source, it has not previously been technically or economically feasible. Despite previous efforts, experts have regarded wind turbine blades as "unrecyclable" and a problematic source of waste. See Liu et al., "Wind Turbine Blade Waste in 2050," Waste Management, Vol. 62, pp. 229-240 (April 2017). With the growing importance of wind power in worldwide energy production, this problem will only get worse.

One obstacle is that if a potentially viable recycling process is proposed, wind turbine owners and manufacturers have no reliable way to verify which of the blades have been properly recycled and where the recycled material originated, among other obstacles.

The applicant has determined that these obstacles continue to inhibit the development of wind turbine blade recycling processes, partially because there is currently no system to efficiently track the status of blades after installation at a wind farm. Tracking the status of wind turbine blades in a recycling process is important for several reasons. For example, as suggested above, such a tracking system would allow turbine owners, utilities, or certification organizations to determine whether blades have been recycled properly and to correlate each recycled blade and its raw material that can be used for feedstock for various products. As another example, a tracking system would allow recyclers to adjust or redesign recycling processes to achieve further productivity and quality gains. In addition, when recycled blades are transformed into useful raw materials, the tracking system would provide manufacturers with additional intelligence to improve the productivity and quality of their manufacturing processes.

As a greater part of commercial and residential power is provided through renewable resources, the supply of used and no longer serviceable wind turbine blades has grown. Therefore, a need exists for methods to recycle the no-longer serviceable wind turbine blades, and other objects, and track the status of the recycling process accordingly.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a method of recycling wind turbine blades is provided. The method generally includes obtaining a wind turbine blade for recycling; scanning a radio-frequency identification (RFID) tag attached to the wind turbine blade to obtain a blade code that uniquely identifies the wind turbine blade within a recycling management database at a remote computer system; uploading the blade code to the recycling management database at the remote computer system; sectioning the wind turbine blade into two sections by cutting the wind turbine blade at an intermediate location along a length of the wind turbine blade; transporting the wind turbine blade sections to a feed bin of a crushing machine and conveying the wind turbine blade sections from the feed bin to a rotating crushing drum; crushing the wind turbine blade sections in the rotating crushing drum to produce blade pieces; conveying the blade pieces to a chute configured to direct the blade pieces into a container; loading the blade pieces into the container; scanning an RFID tag attached to the container to obtain a container code that uniquely identifies the container within the recycling management database; uploading the container code to the recycling management database at the remote computer system, wherein association of the blade code and the container code in the recycling management database facilitates unambiguous tracking of the wind turbine blade during the recycling process; and loading the blade pieces into a transportation vessel.

In accordance with another embodiment of the present disclosure, a method of recycling fiber-composite source items to produce supply material is provided. The method generally includes obtaining a fiber-composite source item for recycling; scanning an RFID tag attached to the fiber-composite source item to obtain a source item code that uniquely identifies the fiber-composite source item within a recycling management database at a remote computer system; uploading the source item code to the recycling management database at the remote computer system; sectioning the fiber-composite source item into two sections by cutting the fiber-composite source item at an intermediate location along a length of the fiber-composite source item; transporting the fiber-composite source item sections to a feed bin of a crushing machine and conveying the fiber-composite source item sections from the feed bin to a rotating crushing drum; crushing the fiber-composite source item sections in the rotating crushing drum to produce source item pieces; conveying the source item pieces to a grinding machine configured to break the source item pieces into smaller source item particles; grinding the source item pieces to produce the source item particles having a maximum length dimension of about ½ inch; conveying the source item particles to a chute configured to direct the blade particles into a container; loading the source item particles into the container; scanning an RFID tag attached to the container to obtain a container code that uniquely identifies the container within the recycling management database; uploading the container code to the recycling management database at the remote computer system, wherein association of the source item code and the container code in the recycling management database facilitates unambiguous tracking of the fiber-composite source item during the recycling process; transporting the container to a loading hopper; unloading the source item particles from the container into the hopper; and directing the source item particles through a conduit to an outlet at a transportation vessel.

In accordance with another embodiment of the present disclosure, a method of recycling wind turbine blades is provided. The method generally includes obtaining a wind turbine blade for recycling; receiving, via radio-frequency communication with a transmitter attached to the wind turbine blade, a blade code that uniquely identifies the wind turbine blade within a recycling management database at a remote computer system; uploading the blade code to the recycling management database at the remote computer system; sectioning the wind turbine blade into at least two sections by cutting the wind turbine blade at an intermediate location along a length of the wind turbine blade; transporting the at least two wind turbine blade sections to a feed bin of a crushing machine and conveying the at least two wind turbine blade sections from the feed bin to a rotating crushing drum; crushing the at least two wind turbine blade sections in the rotating crushing drum to produce blade pieces; conveying the blade pieces to a grinding machine configured to break the blade pieces into smaller blade particles; grinding the blade pieces to produce the blade particles; conveying the blade particles to a chute configured to direct the blade particles into a container; loading the blade particles into the container; receiving, via radio-frequency communication with a transmitter attached to the container, a container code that uniquely identifies the container within the recycling management database; uploading the container code to the recycling management database at the remote computer system, wherein association of the blade code and the container code in the recycling management database facilitates unambiguous tracking of the wind turbine blade during the recycling process; and loading the blade particles into a transportation vessel.

In accordance with any of the embodiments disclosed herein, the method may further include transporting the blade pieces to a manufacturing facility; unloading the blade pieces at the manufacturing facility; manufacturing a product at the manufacturing facility using the blade pieces; scanning an RFID tag of the manufactured product to obtain a product code that uniquely identifies the manufactured product within the recycling management database; and uploading the product code to the recycling management database at the remote computer system, wherein association of the blade code, the container code, and the product code in the recycling management database facilitates unambiguous tracking of the wind turbine blade during the recycling process.

In accordance with any of the embodiments disclosed herein, the step of loading the blade pieces into a transportation vessel may further include transporting the container to a loading hopper having an auger; unloading the blade pieces from the container into the hopper; and directing the blade pieces through a conduit with the auger to an outlet at the transportation vessel.

In accordance with any of the embodiments disclosed herein, the method may further include a step of sectioning each of the wind turbine blade sections into two or more sub-sections.

In accordance with any of the embodiments disclosed herein, the step of cutting the wind turbine blade may be performed using a cutting tool selected from the group consisting of a wire saw having an endless loop abrasive cable, a circular saw, a grinder, an impact blade, a torch, and a waterjet.

In accordance with any of the embodiments disclosed herein, the blade pieces may have a maximum length dimension in the range between about 1 inch and about 4 inches following the step of crushing.

In accordance with any of the embodiments disclosed herein, the blade pieces may have a maximum length dimension in the range between about 2 inches and about 3 inches following the step of crushing.

In accordance with any of the embodiments disclosed herein, the step of conveying the blade pieces to the chute may be performed using an inclined conveyor.

In accordance with any of the embodiments disclosed herein, the method may further include a step of suppressing dust from the crushing machine using a dust collection rig.

In accordance with any of the embodiments disclosed herein, the crushing machine may include a mobility system such that the crushing machine is movable to a different position, the device selected from the group consisting of wheels, continuous tracks, and skids.

In accordance with any of the embodiments disclosed herein, the container may be a bag having a discharge spout at a bottom end.

In accordance with any of the embodiments disclosed herein, the outlet may be an electrically controlled load-out spout at the end of the conduit.

In accordance with any of the embodiments disclosed herein, the method may further include the step of weighing the container following the step of loading the blade pieces into the container.

In accordance with any of the embodiments disclosed herein, the transportation vessel may be selected from the group consisting of a tanker truck tank, a railcar, and an intermodal shipping container.

In accordance with any of the embodiments disclosed herein, the method may further include transporting the source item particles to a manufacturing facility; unloading the source item particles at the manufacturing facility; manufacturing a product at the manufacturing facility using the source item particles; scanning an RFID tag of the manufactured product to obtain a product code that uniquely identifies the manufactured product within the recycling management database; uploading the product code to the recycling management database at the remote computer system, wherein association of the source item code, the container code, and the product code in the recycling management database facilitates unambiguous tracking of the fiber-composite source item during the recycling process.

In accordance with any of the embodiments disclosed herein, the method may further include transporting the blade particles to a manufacturing facility; unloading the blade particles at the manufacturing facility; manufacturing a product at the manufacturing facility using the blade particles; receiving, via radio-frequency communication, a product code that uniquely identifies the manufactured product within the recycling management database; and uploading the product code to the recycling management database at the remote computer system, wherein association of the blade code, the container code, and the product code in the recycling management database facilitates unambiguous tracking of the wind turbine blade during the recycling process.

In accordance with any of the embodiments disclosed herein, radio-frequency communication may include communication with an RFID tag.

In accordance with any of the embodiments disclosed herein, radio-frequency communication may comprise near-field communication (NFC).

In accordance with any of the embodiments disclosed herein, the recycling management database may be accessible via a user interface at a client device.

In accordance with another embodiment of the present disclosure, a system for recycling wind turbine blades is provided. The system generally includes a saw configured to section a wind turbine blade into at least two sections by cutting the wind turbine blade at an intermediate location along a length of the wind turbine blade; a crushing machine comprising a rotating crushing drum configured to crush the at least two wind turbine blade sections to produce blade pieces; a grinding machine configured to break the blade pieces into smaller blade particles; a container configured to receive the blade particles; one or more RFID readers configured to communicate via radio-frequency communication with an RFID tag attached to the wind turbine prior to cutting to obtain a blade code that uniquely identifies the wind turbine blade within the recycling management database, and an RFID tag attached to the container to obtain a container code that uniquely identifies the container within the recycling management database; a computing device configured to upload the blade code and the container code to the recycling management database at the remote computer system; and the remote computer system, wherein the remote computer system may be programmed to associate the blade code and the container code in the recycling management database, and wherein the association of the blade code and the container code facilitates unambiguous tracking of the wind turbine blade during the recycling process.

In accordance with any of the embodiments disclosed herein, the remote computer system may be further programmed to associate the blade code and the container code with a product code in the recycling management database, wherein the association of the blade code, the container code, and the product code facilitates unambiguous tracking of the wind turbine blade during the recycling process and a subsequent manufacturing process.

In accordance with any of the embodiments disclosed herein, the RFID tags may be passive RFID tags.

In accordance with any of the embodiments disclosed herein, the grinding machine may be configured to produce blade particles have a maximum length dimension of about ½ inch.

In accordance with any of the embodiments disclosed herein, the grinding machine may be configured to produce blade particles have a maximum length dimension of about ¼ inch.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 7 is a diagram of illustrative information that may be stored in database records in the recycling management database depicted in FIG. 5 or FIG. 6, in accordance with another aspect of the present disclosure;

FIGS. 8-16 are screenshot diagrams depicting illustrative features of user interfaces for viewing and filtering data, in accordance with another aspect of the present disclosure.

DETAILED DESCRIPTION

Figure 1:
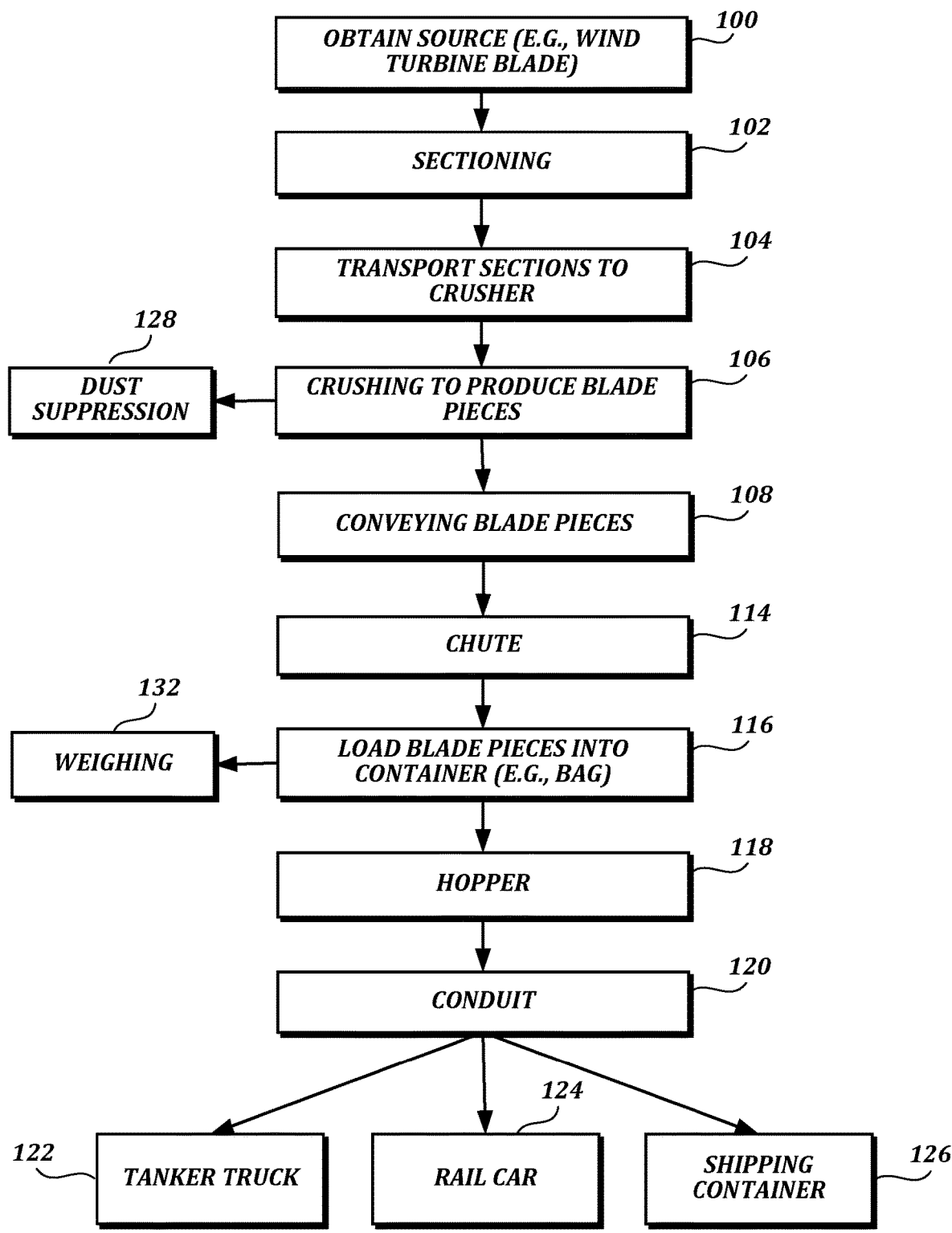
FIG. 1 is a flow diagram describing a method for recycling wind turbine blades in accordance with one aspect of the present disclosure.

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number.

The following description provides several examples that relate to recycling used fiber composite (e.g., fiberglass) products, such as wind turbine blades. However, the disclosed techniques and tools are not limited to recycling of wind turbine blades. With appropriate modifications, the disclosed methods, techniques, processes, and tools can be adapted for recycling other objects or materials. Suitable other objects or materials may include scrap material from manufacturing processes (e.g. fiber composite manufacturing processes), or other large objects formed entirely of recyclable materials or a combination of recyclable and non-recyclable materials, such as fiber composite boat hulls and hot tubs, among other objects and materials. Although the following description refers to embodiments for recycling wind turbine blades, it should be appreciated that any suitable object or material may be recycled using the aspects of the methods disclosed herein.

Generally described, the method for recycling wind turbine blades includes converting a whole wind turbine blade to an output material state that is useful for manufacturing other products, such as those used in construction of buildings, packaging, raw materials, and pellets, among other products. The recycling process is performed while tracking the progress and location of each wind turbine blade such that the direct source of the output material may be determined. In some embodiments, the method includes sectioning the wind turbine blades, crushing the wind turbine blade sections, tracking the progress of each blade through the process, and loading output materials into a suitable transportation vessel. Correlating each wind turbine blade to a quantity of output material provides several advantages, including various certifications of the material for uses with restricted or otherwise controlled products and materials, cost savings, and other advantages.

The tracking system and method provide a valuable service to entities such as wind farm operators and blade manufacturers. As more blade manufacturers and wind farm operators use this system, there will be a greater volume of blades being recycled, because the process of recycling will be made simpler and faster. A steady stream of materials to recycle will allow recycling facilities to adapt to the available volume of materials. Collection of materials from wind farms can also be improved by the system, with aspects of the collection process, such as data collection and tracking, being automated to improve the efficiency and productivity of the process, which allows recyclers, wind farm owners, and other entities to save time and money.

In another aspect of the invention, techniques and tools are disclosed for computer-implemented tracking and management of recycling processes such as the processes described above. As an example, a method for tracking the life of a wind turbine blade is disclosed. The disclosed method captures the end of life cycle up to the point the blade is processed to either sell output raw materials, such as feedstock, or manufacture a product.

The embodiments disclosed herein go well beyond generic automation of tasks that may otherwise be performed on paper, and provide technical solutions to technical problems. Embodiments of the computer-implemented systems disclosed herein can be closely integrated with the mechanical aspects of recycling and manufacturing processes described herein to make such processes faster and more productive, among other potential benefits.

For example, RFID (radio-frequency identification) technology can be used to automate tracking data and populate the database with identifiers and other information, from an identifier for the original turbine tower on which the blade was mounted, through the manufactured product in which the materials produced via processing of the recycled blade is incorporated. Illustrative uses of RFID technology are described in further detail below.

In addition, because the paperwork process of blade creation, maintenance, and disposal could be streamlined by software to increase revenue by reducing downtime, there are additional benefits provided by the technical solutions disclosed herein. Some reasons for these additional benefits include the fact that several forms are produced throughout the lifetime of a blade, which include import and export forms for transporting the blade, certificates of destruction for each blade, and various tax forms to state and federal agencies. These factors enhance the need for technical solutions to improve the efficiency and quality of the recycling process, and technical solutions described herein can lessen the effect of such burdens.

Referring to FIG. 1, a method for recycling a source object, such as a wind turbine blade, for providing raw output materials to be used in the production of new composite products, including fiber-reinforced plastics (FRP), is shown. The method generally includes obtaining the source object for recycling, sectioning the source object in to two or more sections, transporting the source object sections to the feed bin of a crushing machine, conveying the source object sections from the feed bin to a rotating crushing drum, crushing the source object sections, the crushing occurring in the rotating crushing drum to produce source object pieces, conveying the source object pieces to a chute configured to direct the source object pieces into a container, loading the source object pieces into the container, and loading the source object pieces into a transportation vessel. In some embodiments, the step of crushing the source object sections is performed with dust suppression measures to limit the environmental impact of the method. In other embodiments, a step of weighing the container having the source object pieces is performed prior to loading the source object pieces into a transportation vessel. The step of loading the source object pieces into a transportation vessel generally includes transporting the container to a loading hopper having an auger, unloading the blade pieces from the container into the hopper, and directing the blade pieces through a conduit with the auger to an outlet at the transportation vessel.

In block 100, a source object, such as a wind turbine blade, is obtained. In one embodiment, the wind turbine blade is sourced at a wind turbine farm where the blade has a specific effective life expectancy. At the end of the useful life, the blade may be selected for removal and replacement. After removal from the wind turbine tower, the methods disclosed herein are suitable for recycling the wind turbine blade into raw materials that are useful for creating new products. In some embodiments, the wind turbine blade is obtained and partially processed at the wind turbine farm. In other embodiments, the wind turbine blade is delivered to a facility for carrying out the steps of the method disclosed herein. In the embodiments disclosed herein, any number of blades may be processed simultaneously or in succession. For simplicity, the following description refers to a single wind turbine blade; however, applying the method to any number of wind turbine blades, or other source objects, is within the scope of the present disclosure.

In block 102, the wind turbine blade is sectioned into two or more sections. In some embodiments, the sectioning is performed at the wind turbine farm before the wind turbine blade is transported to a facility to perform the remaining steps of the method. The sectioning step may be performed by any suitable cutting tool, such as a wire saw having an endless loop abrasive cable, a circular saw, a grinder, an impact blade, a torch, or a waterjet. In embodiments where the sectioning is performed at the wind turbine farm, suitable environmental precautions may be taken. In one embodiment using the aforementioned wire saw, an oscillating or reciprocating cable is used.

After block 102, the wind turbine blade sections are transported to a feed bin of a crushing machine, block 104. In an embodiment, a crane having jaws, for example, can be used to hoist and load the feed bin, block 104. The crane may ride on continuous tracks to provide mobility. In some embodiments, the transportation of the wind turbine blade sections requires racks to secure the wind turbine blade sections to a trailer or other type of transporting system.

After block 104, the wind turbine blade sections are located in the feed bin for the crushing machine. The wind turbine blade sections are conveyed to a rotating crushing drum of the crushing machine at block 106. The crushing machine is configured to break the wind turbine blade sections into smaller blade pieces. In some embodiments, the crushing machine processes the wind turbine blade sections until the blade pieces have a maximum length dimension in the range between about 1 inch and about 4 inches. In other embodiments, the crushing machine processes the wind turbine blade sections until the blade pieces have a maximum length dimension in the range between about 2 inch and about 3 inches. In one embodiment, the rotating crushing drum has teeth to break the wind turbine blade sections into smaller blade pieces. In some embodiments, the crushing machine includes a mobility system such that the crushing machine is movable to a different position. Such mobility system may include wheels, continuous tracks, skids, or any other suitable system. In this regard, the crusher may be moved to a particular site where the wind turbine blades are stored.

At block 106, the step of crushing the wind turbine blade sections may include dust suppression at block 128 for environmental considerations, employee safety, and workplace cleanliness. In some embodiments, the dust suppression at block 128 includes liquid or foam spray, vacuum entrapment, filters, chemicals, and any other suitable dust suppression. In embodiments using liquid or foam spray, and atomized spray may be used to cover the area of the crushing machine where dust is escaping.

From block 106, the method enters block 108. In block 108, the blade pieces coming from the crushing machine, block 106, are fed to an inclined conveyor to be transferred to a chute, block 114. One embodiment of the inclined conveyor, block 108, includes an endless belt of links, such as metal links. In some embodiments, the conveyor is mobile and may be supported by a carriage that has wheels. The incline of the conveyor allows machinery to position containers under the chute at block 114, as will be explained in greater detail below.

From block 108, the method enters block 114, where the chute is positioned at the upper end of the inclined conveyor, block 108, and configured to direct the blade pieces into a container at block 116. Thus, the chute hopper, block 106, is elevated off the ground, such that machinery may be positioned under the chute to load the blade pieces into a container at block 116. In some embodiments, the chute collects the blade pieces and directs them into a slot. In an embodiment, the chute includes three upright sides, the fourth of which is open to receive an upper end of the inclined conveyor, block 108. In another embodiment, the chute hopper, block 114, has an open top. In another embodiment, the chute, block 114, has a funnel portion shaped from four sloping walls, for example, to leave an opening in the bottom for directing the blade pieces.

From block 114, the method enters block 116, where the blade pieces are loaded into a container. In some embodiments the container is a bag, such as an industrial bulk bag made from flexible and durable fabrics, for example, nylon. In other embodiments, the container is any suitable container for collecting the blade pieces from the chute at block 114. In an embodiment, the bulk bags have handles for coupling to forks of a front loader. However, other embodiments use any suitable bulk bag. In an embodiment, the bulk bags have an open top end, and the bottom end has a discharge spout for unloading the bulk bag.

From block 116, the method optionally enters block 132, where the container is weighed. In an embodiment, the weigh scale is placed on the ground directly beneath the bulk bag. In another embodiment, the weigh scale is a flat, low profile weigh scale. In one example, to weigh the filled bulk bag, the front loader lowers the bulk bag onto the weigh scale to the point where no weight is being carried by the front loader. The weight is recorded so that the weight of the material in the bulk bag can be known, such as for tracking purposes, which will be explained in greater detail below. At this point in the method, the filled bags can be loaded onto a vehicle, for example, to be transported to another location.

From block 116, the method enters block 118, where the container is transported to a loading hopper for loading the blade pieces into a transportation vessel. In some embodiments, the loading hopper has an auger for directing the blade pieces through a conduit at block 120. In the loading step with the loading hopper, at block 118, the discharge spout of the bulk bag is used to empty the contents of the bag back into the loading hopper. In some embodiments, the bulk bags can be unloaded into a plurality of transportation vessels, for example, a tanker truck tank at block 122, a railcar at block 124, and an intermodal shipping container at block 126. In embodiments using an intermodal shipping container, the containers may have various sizes suitable for transport by a flatbed truck, a train, or a ship, among other transport options. The loading hopper at block 118 may be low-profile such that the equipment does not need to be raised for use of the loading hopper. In some embodiments, the spreading distance of the hopper is adjustable such that the distance and range of the distribution of the blade pieces can be controlled for different transportation vessels. In other embodiments, the loading hopper is automated such that a filled condition causes the auger to stop and purge the conduit at block 120.

In some embodiments, the loading hopper at block 118 is suitably a Bazooka Tube 1200 Transloader available from Diversified Storage Systems at 46 HC Pioneer Parkway, Sulphur Springs, Tex. 75482. The Bazooka Tube Transloader can be used with Supersax as containers and is suitable for loading onto railcars, trucks, and intermodal shipping containers, for example. The transloader includes a rectangular hopper which is filled from the top via the bulk bags, block 116. The hopper is fitted with an internal auger. The bottom of the hopper is connected to the conduit at block 120 leading to the load-out spout. In these embodiments, the load-out spout is electrically controlled. In addition, the height of the conduit and load-out spout is hydraulically controlled such that a variety of transportation vessels may be used. In an embodiment, the hopper has a vibration generator to assist in the transfer of material through the hopper and out of the conduit. In an embodiment, the transloader uses an air supply to transfer the material through the conduit.

Figure 2:
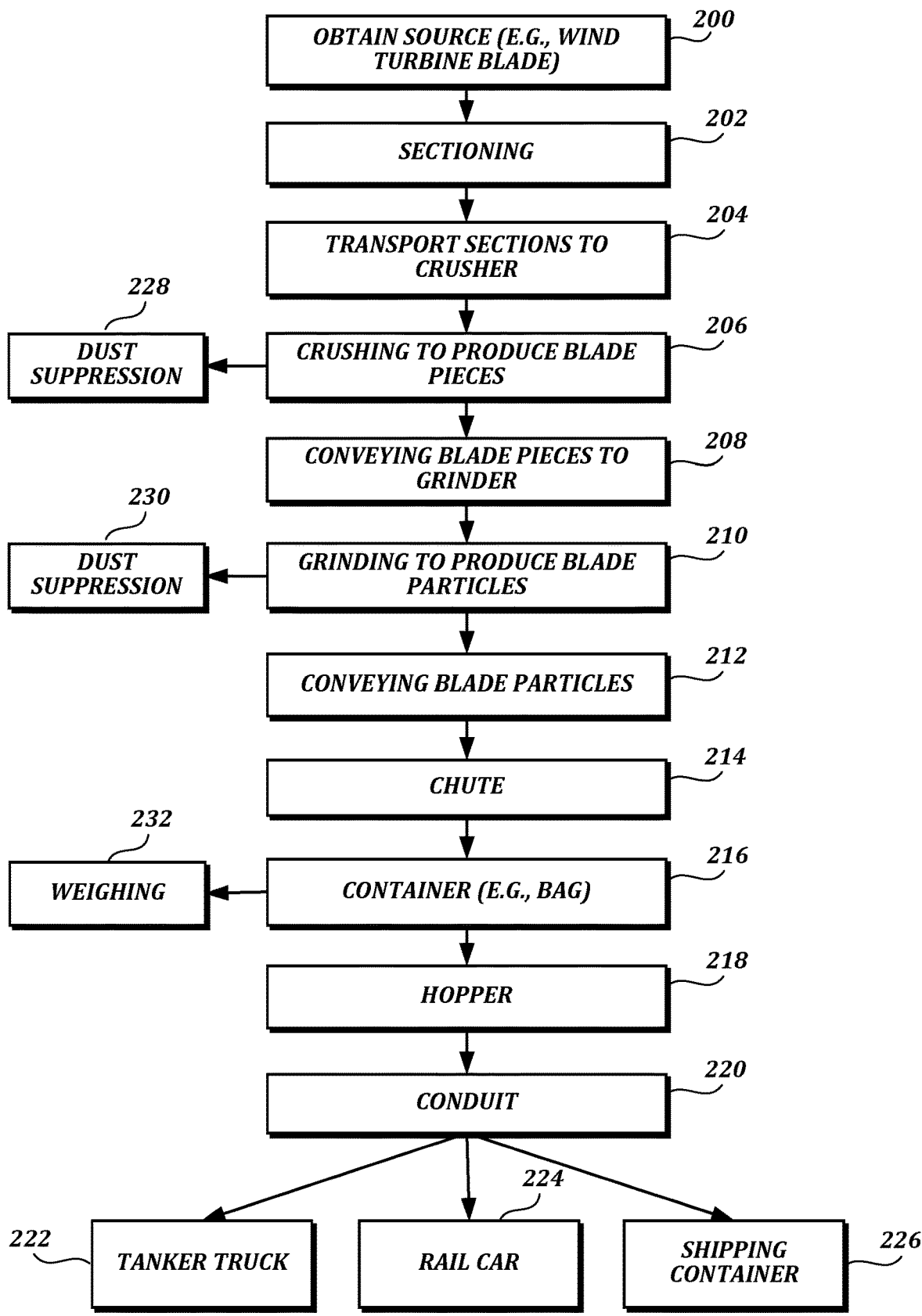
FIG. 2 is a flow diagram describing a method for recycling wind turbine blades in accordance with another aspect of the present disclosure.

Turning to FIG. 2, another method for recycling a source object, such as a wind turbine blade, for providing raw materials to be used in the production of new composite products, including fiber-reinforced plastics (FRP), is shown. The method shown in FIG. 2 is substantially similar in steps and process as the method shown FIG. 1, described above, except with respect to the inclusion of a step of grinding the blade pieces to produce blade particles. For clarity in the ensuing descriptions, numeral references of like step blocks in the 100 series for the method in FIG. 1 are in the 200 series for the corresponding steps in FIG. 2.

Similarly to the method of FIG. 1, the method in FIG. 2 generally includes obtaining the source object for recycling, sectioning the source object in to two or more sections, transporting the source object sections to the feed bin of a crushing machine, conveying the source object sections from the feed bin to a rotating crushing drum, crushing the source object sections, the crushing occurring in the rotating crushing drum to produce source object pieces, conveying the source object pieces to a grinding machine configured to break the source object pieces into smaller source object particles, grinding the source object pieces into source object particles, conveying the source object particles to a chute configured to direct the source object particles into a container, loading the source object particles into the container, and loading the source object particles into a transportation vessel. In some embodiments, the steps of crushing the source object sections and/or grinding the source object particles is performed with dust suppression measures to limit the environmental impact of the method. In other embodiments, a step of weighing the container having the source object particles is performed prior to loading the source object particles into a transportation vessel. The step of loading the source object particles into a transportation vessel generally includes transporting the container to a loading hopper having an auger, unloading the blade particles from the container into the hopper, and directing the blade particles through a conduit with the auger to an outlet at the transportation vessel.

Blocks 200, 202, 204, and 206 are substantially similar to the steps of the method of FIG. 1, described above. In one embodiment, at block 208, the blade pieces coming from the crushing machine, block 206, are fed to a conveyor to be transferred to a grinding machine at block 210. One embodiment of the conveyor, block 208, includes an endless belt of links, such as metal links. In some embodiments, the conveyor is mobile and may be supported by a carriage that has wheels. In other embodiments, the blade pieces coming from the crushing machine, block 206, are transported to the grinder, block 210, using any suitable method.

From block 208, the method enters block 210, where the blade pieces are ground into smaller blade particles by the grinding machine. In some embodiments, the grinding machine at block 210 is suitably an ISODAN® Standard Fiber Production Plant installed into a 20 foot shipping container, available from Isodan ApS, Maribovej 20, Denmark-4960 Holeby. The grinding machine is configured to break the wind turbine blade pieces from the grinding machine into smaller blade particles. In some embodiments, the grinding machine processes the wind turbine blade pieces into blade particles having a maximum length dimension less than about ½ inch. In other embodiments, the grinding machine processes the wind turbine blade pieces into blade particles having a maximum length dimension less than about ¼ inch. At block 210, the step of grinding the blade pieces may include dust suppression at block 230 for environmental reasons, employee safety, and workplace cleanliness. In some embodiments, the dust suppression at block 230 includes an external liquid or foam spray, vacuum entrapment, filters, chemicals, and any other suitable dust suppression. In embodiments using liquid or foam spray, and atomized spray may be used to cover the area of the grinding machine where dust is escaping. In other embodiments, the grinding machine includes internal dust suppression measures.

From block 210, the method enters block 212. In block 212, the blade particles coming from the grinding machine, block 210, are fed to an inclined conveyor to be transferred to a chute, block 214. One embodiment of the inclined conveyor, block 212, includes an endless belt of links, such as metal links. In some embodiments, the conveyor is mobile and may be supported by a carriage that has wheels. The incline of the conveyor allows machinery to position containers under the chute at block 214, positioned at the upper end of the inclined conveyor, block 208, and configured to direct the blade pieces into a container at block 216. Blocks 214, 216, 218, 220, 222, 224, 226, 228, and 232 are substantially similar to the corresponding steps of the method of FIG. 1, described above.

The methods described herein have several advantages, including, but not limited to, mobility of the individual pieces of equipment, creation of useful raw materials, and tracking of the wind turbine blades from the removal at the blade farm to the raw output material. The combination of the particular equipment can reduce wind turbine blades into raw materials that can be incorporated into other products in a timeframe on the order of minutes. For example, in one embodiment, the process requires about 2 minutes to load the crushing machine, block 106, about 4 minutes to fill the bulk bag, block 116, about 2 minutes to weigh the bag (with an average of about 1000 pounds per bag), block 132, and about 4 minutes for loading the bag to transport to the loading hopper, block 118, resulting in about 12 minutes per bag, or about 5000 pounds of raw material produced per hour.

System for Tracking and Managing the Lifecycle of a Wind Turbine Blade

In this section, techniques and tools are described for computer-implemented tracking and management of recycling processes such as the processes described above. As noted above, although the prospect of recycling wind turbine blades may be attractive and consistent with the notion of wind energy as a "green" power source, it has not previously been technically or economically feasible. Despite previous efforts, experts have regarded wind turbine blades as "unrecyclable" and a problematic source of waste. One obstacle is that if a potentially viable recycling process is proposed, wind turbine owners and manufacturers have no reliable way to verify whether the blades have actually been properly recycled. The applicant has determined that such obstacles continue to inhibit the development of wind turbine blade recycling processes, in part because there is currently no system to track the status of blades in an efficient manner.

The embodiments disclosed herein go well beyond generic automation of tasks that may otherwise be performed on paper, and provide technical solutions to technical problems described herein. Embodiments of the computer-implemented systems disclosed herein can be closely integrated with the mechanical aspects of recycling and manufacturing processes described herein to make such processes faster and more productive, among other potential benefits.

Figure 3:
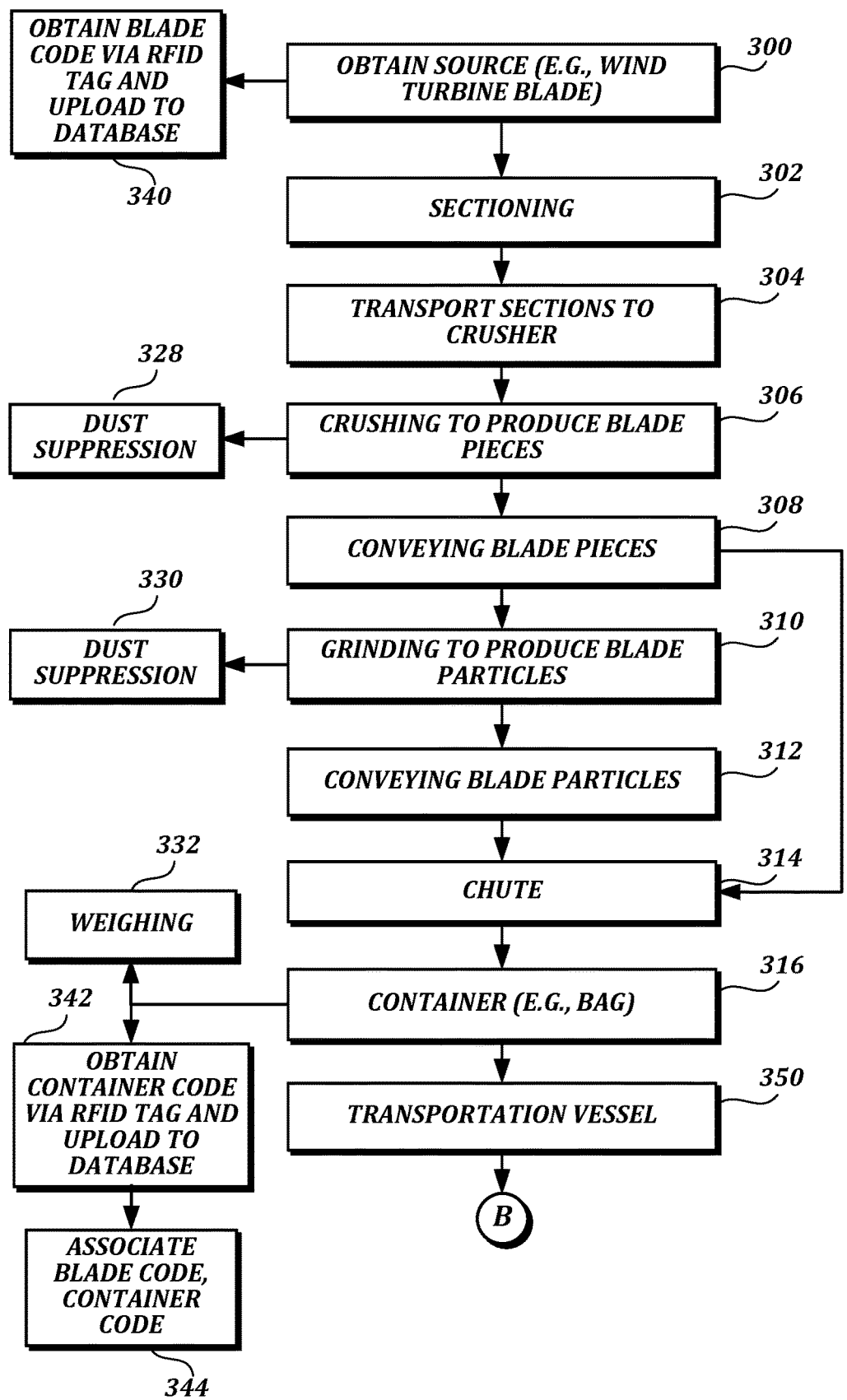
FIG. 3 is a flow diagram describing a method for recycling a source object that employs short-range radio-frequency communication technology for exchange of digital information in accordance with another aspect of the present disclosure.

FIG. 3 is a flow diagram describing a method for recycling a source object that is similar in several respects to the process described with reference to FIGS. 1 and 2, above. In the example shown in FIG. 3, short-range radio-frequency communication technology for exchange of digital information (e.g., RFID technology, near-field communication (NFC) technology, or the like) is used to improve the recycling process.

The process in FIG. 3 generally includes obtaining a source object (e.g., a wind turbine blade) for recycling. Blocks 300, 302, 304, 306, 328, and 308 are substantially similar to steps of FIGS. 1 and 2, described above. However, the process of FIG. 3 includes an additional block 340 in which a source object code (e.g., a blade code) is obtained (e.g., via an RFID tag on the source object) and uploaded to a database, as described in further detail below. Blocks 310, 312, and 330 are substantially similar to steps of FIG. 2. Blocks 314, 316, 330, and 332 are substantially similar to steps of FIGS. 1 and 2 described above. However, the process of FIG. 3 includes additional steps 342 and 344 in which a container code is obtained (e.g., via an RFID tag on the container) and uploaded to the database, and the container code is associated with the source object code in the database, as described in further detail below. From block 316, the pieces or particles (or the container that contains those pieces or particles) are loaded into a transportation vessel at block 350.

Figure 4:
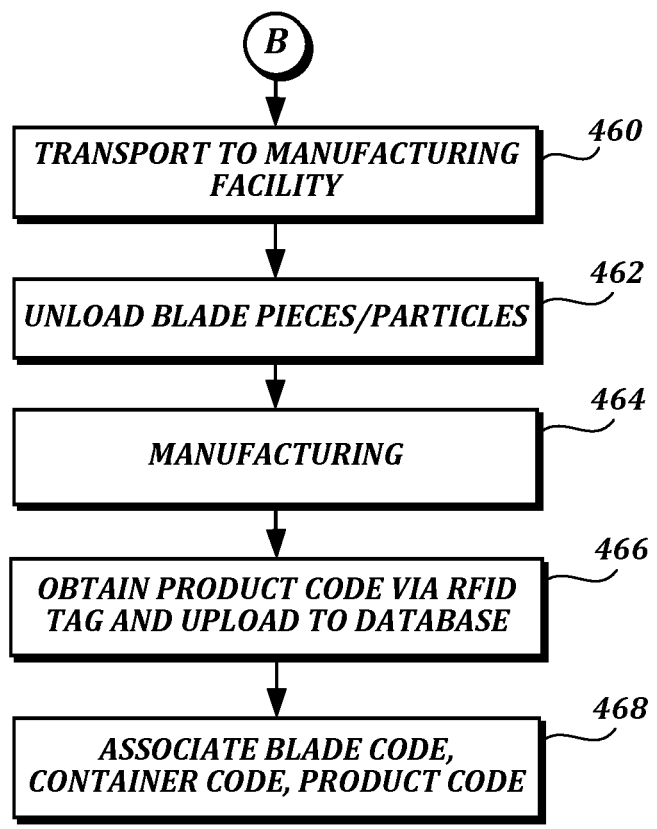
FIG. 4 is a flow diagram describing an extension of the method shown in FIG. 3, in accordance with another aspect of the present disclosure.

As shown in FIG. 3, an option is provided at terminal B for further tracking and management of the process at a manufacturing facility, as shown in FIG. 4. In the example shown in FIG. 4, at block 460 the pieces or particles are transported to a manufacturing facility. At block 462, the pieces or particles are unloaded at the manufacturing facility, and at block 464 a new product is manufactured using the pieces or particles. At block 466, a product code is obtained (e.g., via an RFID tag on the new product) and uploaded to the database. At block 468, the product code is associated with the source object code and the container code in the database, as described in further detail below. It should be understood that the manufacturing facility may be at a different site or the same site as the recycling facility.

As mentioned above, the short-range radio-frequency communication technology that may be used for exchange of digital information in described embodiments may include, for example, RFID technology or NFC technology. In some embodiments, RFID devices are used. Such devices include RFID tags and RFID readers (also referred to as scanners or interrogators). RFID devices used in described embodiments may employ different types of RFID technology. As one example, passive RFID tags may be used. In this arrangement, a powered RFID reader (also referred to as a scanner or interrogator) positioned within a short range of the tag provides enough energy to the circuitry of the tag via its radio waves to induce the tag to transmit information, such as an alphanumeric identifier, stored on the tag. As another example, active RFID tags may be used. In this arrangement, a local power source (e.g., battery) is included within the tag or a larger package that includes the tag. The powered tag can transmit information at a greater distance, as the tag does not need to obtain its energy from the reader. Other options include battery-assisted passive tags.

The ways in which the process steps may be carried out may vary in practice depending on factors such as the source objects being recycled, the requirements of the recycling certification process (if any), the requirements of downstream manufacturers (e.g., the form in which recycled source material must be provided for new products to be manufactured), and the particular configuration of the recycling machinery. In an illustrative usage scenario involving RFID technology, the process can be divided into stages as follows:

1) source collected (e.g., blades cut) from site;
2) RFID tag for source attached to blade and scanned, and related information entered in database (e.g., weight, date, site information, RFID code number for source/blade);
3) blades/source put into storage (e.g., in storage yard);
4) blades/source crushed and/or ground into feedstock;
5) feedstock put in bag/container (in an embodiment, only 1 source (e.g., blade) per container (e.g., bag) maximum is allowed to prevent commingling and allow for unambiguous tracking of individual blades through the recycling process);
6) RFID tag for bag/container attached and scanned, and related information entered in database (e.g., weight, date, source material type, RFID code number for bag/container of feedstock);
7) bagged feedstock (e.g., pieces, particles, fibers) put into storage (e.g., until needed for manufacturing a new product or making an intermediate product, such as pellets);
8) feedstock made into pellets and bagged (optional depending on process);
9) if step 8 above is performed, RFID tag attached to pellet bag/container and scanned, and related information entered in database: (e.g., date, weight, source material, source bag/container type, RFID code number for bag/container);
10) pellets/feedstock made into end product (e.g., panel, railroad tie, pallet, etc.); and
11) RFID tag attached to final product and scanned, and related information entered in database (e.g., date, weight source material, source bag, RFID code number for product).

Many alternatives to this illustrative process are possible. For example, although the process refers to attaching RFID tags to sources after they have been collected, it also possible and may be preferable to attach such tags at an earlier stage, e.g., at installation. As another example, although the process refers to attaching RFID tags to bags/containers after feedstock is loaded into them, it is also possible an may be preferable to attach such tags at an earlier stage.

By tracking serial numbers and similar information back from the final end product using technology such as RFID tags and RFID readers, the source (e.g., blade) for a given end product can be unambiguously identified. As noted above, in situations where unambiguous tracking of individual sources through the recycling process may be required (e.g., for certification purposes), all source material from a unique source must be kept physically separate from other source material to prevent commingling through the process, e.g., when bagged or transported. Otherwise, the source information becomes invalid or ambiguous and the end product cannot be tracked to a unique source.

RFID readers/scanners may be used to automatically detect identifiers associated with RFID tags on sources/blades, bags/containers, products, vehicles, or other items that may have RFID tags attached. In this way, the progress of a recycling or manufacturing process involving recycled materials can be closely tracked and analyzed. An RFID scanning system (e.g., an RFID reader coupled with an appropriately configured computer) can be used to not only detect the identifier, but to add the identifier directly to the database without manual entry. Other steps in the process also may involve automatically detecting and adding parameters to the database, even without RFID technology. For example, a digital scale coupled to a computer a network interface (or an integrated digital scale with additional computing resources and its own network interface) may be used to automatically weigh sources or feedstock and add corresponding weight information to the database. Alternatively, some non-RFID steps may rely on manual (or other forms) of data entry. For example, where a specially configured digital scale is not available, operators may weigh and manually enter corresponding data that can be added to the database.

Figure 5:
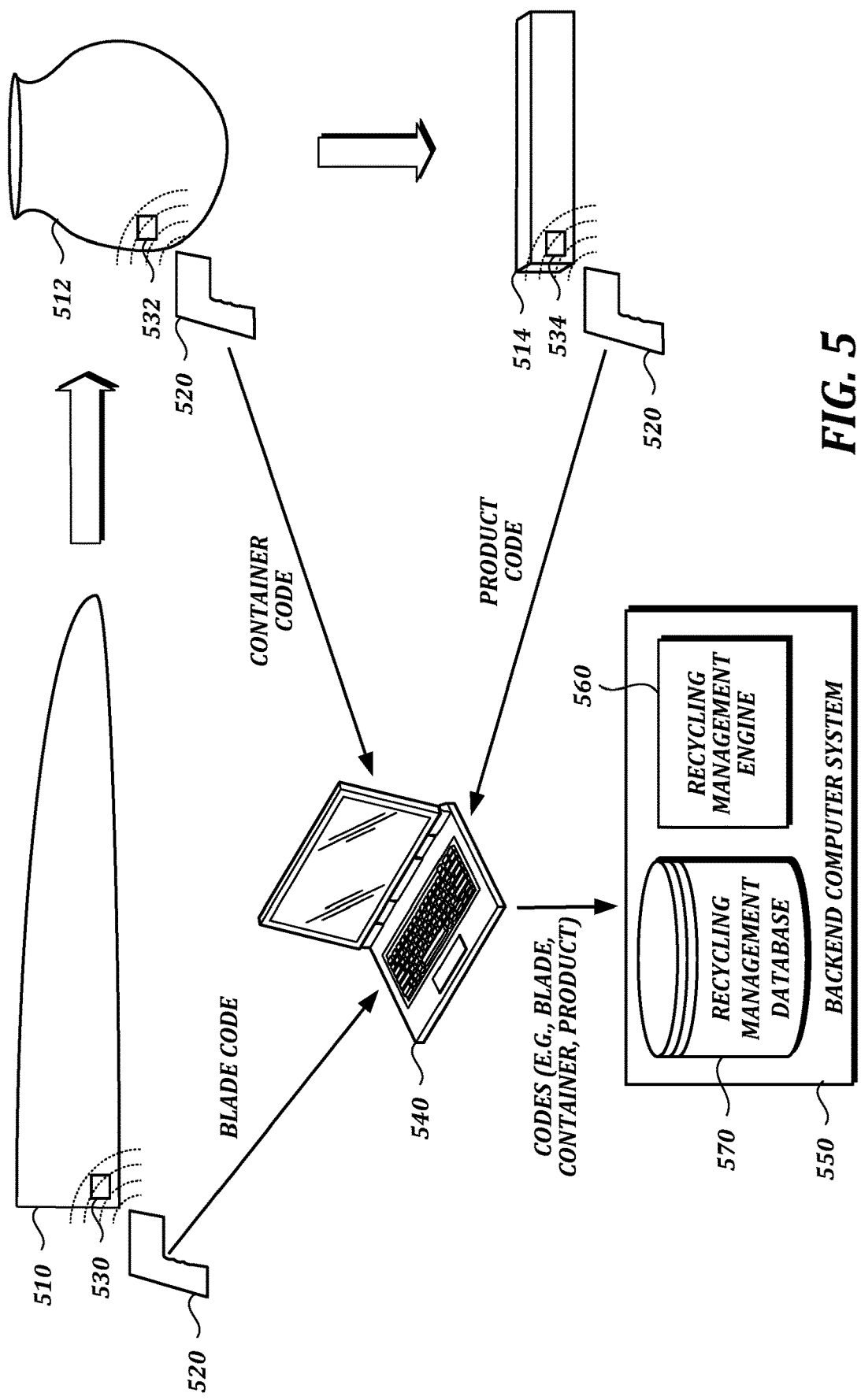
FIG. 5 is a diagram of an illustrative system that may be used to perform aspects of the methods of FIGS. 3 and 4, or other methods for recycling source objects, in accordance with another aspect of the present disclosure.

FIG. 5 is a system diagram of an illustrative system that may be used to perform aspects of the techniques depicted in FIGS. 3 and 4, or other techniques for recycling source objects. In the example shown in FIG. 5, an RFID reader 520 (e.g., a handheld RFID reader) is used to obtain a blade code stored on an RFID tag 230 attached to a wind turbine blade 510. The RFID reader 520 (or some other RFID reader) also is used to obtain a container code stored on an RFID tag 232 attached to a container 512 in which blade pieces or particles are loaded. In embodiments that track the recycling process through additional steps of manufacturing a new product, the RFID reader 520 (or some other RFID reader) may be used to obtain a product code stored on an RFID tag 232 attached to the product 514 (e.g., a railroad tie), packaging of the product, or some other structure associated with the product.

The RFID reader 520 provides codes to a computer 540 (or other computing device) in communication with a backend computer system 550. The backend computer system 550 implements a recycling management engine 560 and a recycling management database 570. The recycling management engine 560 includes logic (e.g., in the form of computer program code) configured to cause one or more computing devices to perform actions described herein as being associated with the engine. For example, a computing device can be specifically programmed to perform the actions by having installed therein a tangible computer-readable medium having computer-executable instructions stored thereon that, when executed by one or more processors of the computing device, cause the computing device to perform the actions. The particular engines described herein are included for ease of discussion, but many alternatives are possible. For example, actions described herein as associated with two or more engines on multiple devices may be performed by a single engine. As another example, actions described herein as associated with a single engine may be performed by two or more engines on the same device or on multiple devices.

The codes may be provided to the backend computer system along with other information, such as additional information stored on the RFID tags 230, 232, 234, or additional information entered by users (e.g., via a user interface presented on the computer 540). As noted above, a manufacturing process may take place at the same site as the recycling process, or at a different site. The same RFID reader and computing device or different readers and devices may be used in different stages.

Many alternatives to the processes described herein are possible. For example, processing stages in the various processes can be separated into additional stages or combined into fewer stages. As another example, processing stages in the various processes can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

Illustrative Software System Architecture and Design Considerations

In this section, an illustrative system architecture and related infrastructure is described in which embodiments described herein may be implemented. In an illustrative arrangement, a blade tracking system includes a database to store and organize blade tracking information (e.g., RFID numbers or other identifiers), a backend computer system (e.g., one or more servers) to carry out operations such as data filtering and data integrations, and one or more interfaces to provide access to the backend computer system and database. The system may have separate interfaces for entities such as wind farm operators, blade manufacturers, and recycling service providers. The database may include all the information about blades in the system disclosed above, a subset of such information, or additional information.

There are multiple options for the location of the database and backend server. In a cloud-based approach, the information may be stored remotely and inputs may be uploaded from input devices (e.g., computer terminals, mobile devices, and/or RFID systems) to the cloud-based database. Further, a cloud-based approach can be used for software distribution. Taking this approach can help to ensure that customers have the most up to date version of the software at all times. Another option is to have each wind farm operation host its own server locally. Although a local server approach may have benefits in some situations, the cloud-based approach has several benefits over a local approach because it will decrease the cost of the package to the operator, making it more attractive. In addition, a cloud-based approach to software distribution can greatly reduce the amount of support necessary of for the application.

The different parties using the system may access the system via different devices. While the system may reside on a local server or a cloud-based server, end users may access the system via a computer terminal, mobile device (e.g., tablet device, smart phone), etc. Inputs to the system may be automated (e.g., via appropriately configured RFID systems) or a combination of manual (e.g., via user interfaces of a computer, tablet device, smart phone, etc.) and automated inputs.

Access to the system can be provided with different possible levels of security and authentication functionality. In an embodiment, a user of the blade tracking system logs in to the system using a unique username and password. For example, a wind farm operator who licenses the system will be given a license number, which they can use to create user accounts. Blade manufacturers and wind farm owners can be linked together in some respects for data sharing (e.g., to share data relating to particular blades). For example, a blade manufacturer can be given access to the data that relates to blades made by them for their respective customers. Other data, such as data relating to blades made by different manufacturers, may not be accessible to that manufacturer. On the wind farm side, the system interface may provide access to the same data as the blade manufacturer for blades made by that manufacturer, and this access may be extended to all wind farm operators having blades from that manufacturer. It should be understood, however, that data sharing arrangements may be governed by local or national regulations on data storage and privacy, industry guidelines, international treaties or trade agreements, contractual obligations, or other factors. The system can be adapted to comply with such requirements.

Figure 6:
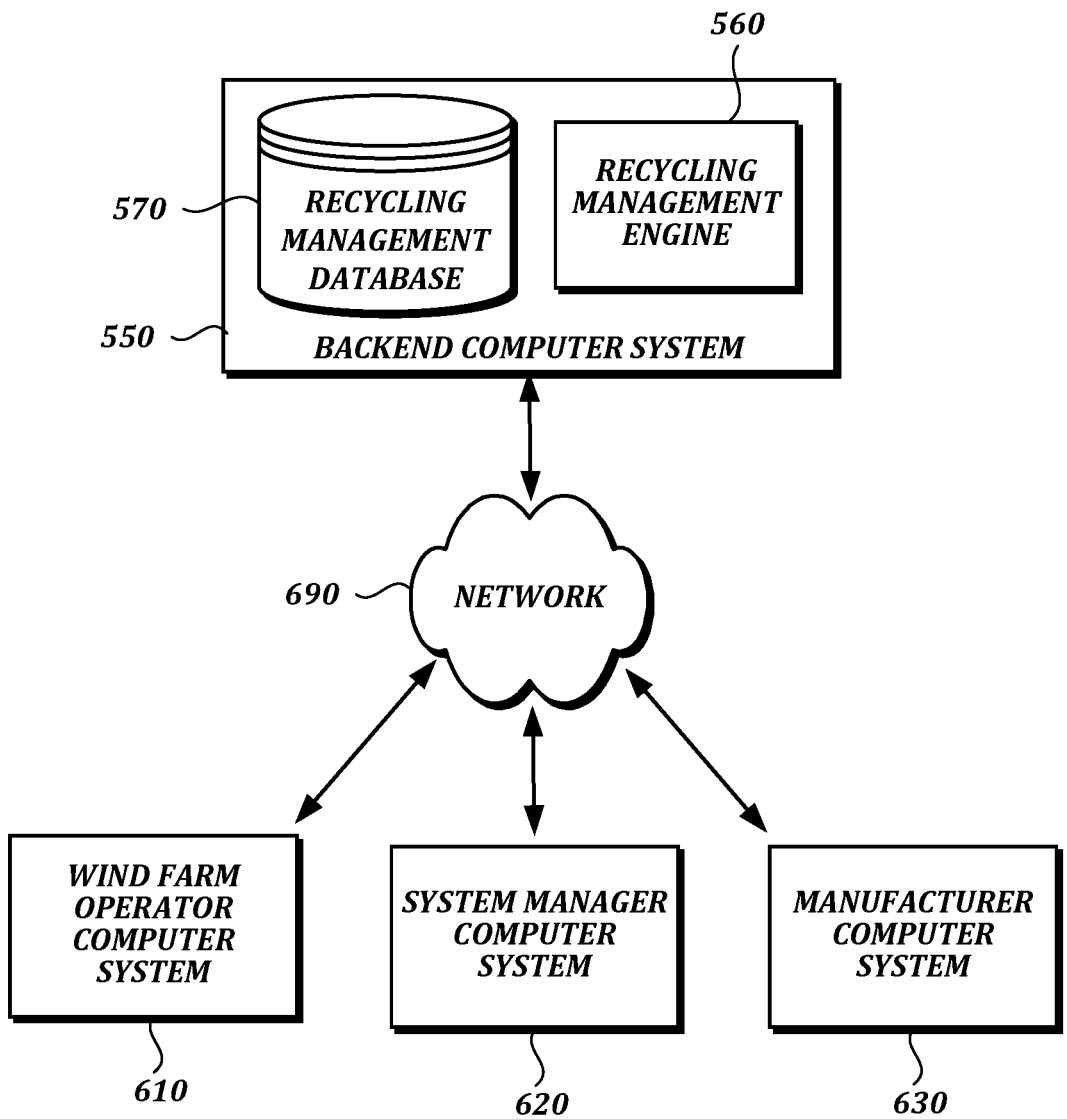
FIG. 6 is a diagram of an illustrative computer system that may be used to provide various entities with access to the recycling management database depicted in FIG. 5 and related functionality, in accordance with another aspect of the present disclosure.

FIG. 6 is a system diagram of an illustrative system that may be used to provide various entities with access to the recycling management database depicted in FIG. 5. In the example shown in FIG. 6, the backend computer system 550 implements a recycling management engine 560 and a recycling management database 570. The backend computer system 550 communicates with other computer systems via a network 690, such as the Internet. These computer systems may include a windfarm operator computer system 610, a system manager/administrator computer system 620, and manufacturer computer system 630. These systems may in turn provide access to the backend computer system 550 computing devices such as laptop or desktop computers, smartphones, or tablet devices.

In an illustrative scenario, access is provided via user interfaces presented to users of the individual client devices. These user interfaces may include web interfaces hosted by the backend computer system or a separate web server and accessed via a web browser, or interfaces provided by standalone applications installed on client devices. The backend computer system 550 may be programmed to perform functions such as form generation, data filtering and processing, CRM integrations, notifications (e.g., automatically sending messages via appropriate communication channels to users as blades begin or complete stages in the recycling process), or other functions.

In this arrangement, the backend computer system 550 provides an interface through which the other computer systems may access the database 570. The permissions granted to different entities and users may vary. In an illustrative scenario, wind farm operators and a system manager can make changes to data via the interface provided by the backend computer system 550, while blade manufacturers may access data in a read-only state. The respective user interfaces of the computer systems for each entity can communicate with the backend computer system 550, which can respond to queries by obtaining and transmitting requested information or making requested changes in the database 570, if such access and changes are authorized for the respective entity or device.

In described embodiments, records related to the blades in their installed state, as well as any number of states in the recycling process, are created and updated in the recycling management database 570. The database 570 may be customized to achieve one or more of the goals described herein with respect to the technological improvements of recycling and manufacturing processes described herein. In one embodiment, such the database 570 includes records that track information in categories such as the following (see column headers of the database record depicted in FIG. 7):
tower: turbine tower ID, e.g., an alphanumeric ID;
serial number: blade: e.g., an alphanumeric ID;
date cut;
origin facility: wind farm ID, e.g., an alphanumeric ID or text string;
blade weight in pounds (or kilograms);
date moved to storage yard;
which yard: e.g., an alphanumeric ID or text string;
RFID #blade: 28 bits organization: a code corresponding to an organization (e.g., wind farm, manufacturer, recycler) associated with the blade;
RFID #blade: 24 bits object class (kind of product): a code corresponding to a type of material of the blade is made, or product of a corresponding recycling process;
RFID #blade: 36 bits serial number): a code corresponding to the serial number of the RFID tag for the blade, or the serial number of the blade itself;
Transport bag #: e.g., an alphanumeric ID;
Transport truck: e.g., an alphanumeric ID, VIN, or license number;
RFID #bag: 28 bits organization: a code corresponding to an organization that manufactured or owns the bag or other container in which the material produced by recycling this blade is contained;
RFID #bag: 24 bits object class (kind of bag): a code corresponding to the type of this bag/container;
RFID #bag: 36 bits serial number): a code corresponding to the serial number of the RFID tag for the bag/container, or the serial number of the bag/container itself;
date at processing: e.g., the date the recycling process begins/ends;
which processing facility: e.g., an alphanumeric ID or text string;
date at product manufacturing: e.g., date the material produced by the recycling process is used to produce a manufactured product;
what product (1 row per item): e.g., an alphanumeric ID or text string;
serial number product: e.g., an alphanumeric ID;
product weight total: e.g., in pounds or kilograms;
product weight of recycled material: e.g., in pounds or kilograms;
RFID #product: 28 bits organization: a code corresponding to an organization that manufactured the product;
RFID #product: 24 bits object class (class of end product): a code corresponding to the type of manufactured product (e.g., panels, ceiling tiles, shipping/storage pallets, railroad ties, manhole covers, etc.); and
RFID #product: 36 bits serial number: a code corresponding to the serial number of the RFID tag for the product, or the serial number of the product itself.

The design of the database and the software system may be adjusted to accommodate or take advantage of particular features of the information being gathered or the technology being used. For example, a database that stores information such as blade composition and dimensions can be used to inform and improve manufacturing processes, and make predictions about the upcoming availability of recycled source material when those blades are recycled. In addition, maintenance data for individual blades can be recorded and transferred to blade manufacturers, which can adjust production schedules in anticipation of the need for new blades. This allows production of new blades to be more efficient.

The software can be tailored to provide many different displays, dashboards, and reports. As examples, such displays, dashboards, and reports can be presented to the client/customer or a certification body. Content for illustrative displays, dashboards, and reports may include text, tables, graphics, and the like. Non-limiting examples of information that may be presented via such displays, dashboards, and reports include:
source/origin (e.g., blade serial number, tower, location harvested);
destination/facility/yard;
final end product made w/serial number (e.g., RFID number); or
status (e.g., "in field," "storage yard," "in transit," "bagged," "end product" (e.g., a specific manufactured product)).

The date of manufacture, installation data, blade composite material, weight, length, and unique identifying serial number of each blade are examples of data that may be stored in a database in described embodiments. Some or all of this data, or other data, may be stored in an RFID tag attached to the blade, as well, and obtained by an RFID reader. Storage of maintenance data is also contemplated in the system, so that the system can estimate, for example, when an old blade should be removed and a new blade should be installed. Alternatively, a human operator can make such estimates based on data or preliminary calculations provided by the system.

The data stored and gathered in described embodiments may be transmitted to, or viewed by, the manufacturer, wind farm operator, or other entities. For example, the data can be used to notify the manufacturer or other entities of the current state of the blade. The data also can be used by the manufacturer to alter blade production schedules and to have new blades already made by the time a wind farm has to replace them. Critical information about the blade may be stored and calculations can be made using such information to assist a wind farm operator in planning the cost of repair and replacement of blades. The movement of the blade can also be tracked and shared between the manufacturer and the wind farm operator.

Because information gathering and processing related to blade creation, maintenance, and disposal can be streamlined to increase revenue by reducing downtime, there are additional benefits provided by the technical solutions disclosed herein. Several forms may be produced throughout the lifetime of a blade, such as import and export forms for transporting the blade, certificates of destruction for each blade, and tax forms for state and federal agencies. For example, data collected by the system also can be used for regulatory or other purposes, which may vary by region. For example, customs or transportation forms may be required to move blades from region to region. Wind farms and the respective manufacturers that they use are typically not located in the same state or even country. Customs import and export forms typically must be created for moving the blades at each port of entry. When a blade gets damaged and is decommissioned, the owner of the blade may wish to recycle it according to one or more embodiments described herein. The blade will be transported to a third party facility for processing, and this typically will also require transportation forms. The disclosed software facilitates (e.g., generates or populates) import and export forms as needed to legally move blades or decomposed blade product. This facilitation includes pulling information from the database to populate the forms.

As another example, wind farm operators that choose to recycle their used wind turbine blades may be eligible for a tax credit or other financial incentive. In at least one embodiment, a software system is similarly designed to facilitate generation of a completed copy of these forms for subsequent processing.

As another example, government agencies or certification organizations may require proof of destruction of the blade. An agency may require that when each blade is destroyed, such as in a recycling process, a certificate of destruction must be filed. This is to ensure that blades are not just dumped illegally or stored in an incorrect manner. In at least one embodiment, a software system is configured to automatically generate this type of certificate such that a corresponding software system on the regulatory side (or a person in a supervisory role that reviews the certificate) will accept it.

These factors enhance the need for technical solutions to improve the efficiency and quality of the recycling process, and technical solutions described herein can lessen the effect of such burdens.

Illustrative User Interfaces

Illustrative embodiments of user/operator interfaces will now be described in terms of input functionality (e.g., forms, such as web forms, for inputting or manipulating data) and output functionality (e.g., screens for display of data, graphics, and related output).

A wind farm interface may include forms and views oriented to wind farm operators. For example, a wind farm interface may include a form (e.g., presented in a browser or a standalone application) to select a blade and enter data for that blade. This form may be used to allow the operator or technician to create an instance of a new blade or select an existing blade and assign data (or modify data) that may be desired or needed for that blade. Entry and modification of blade data (e.g., using RFID systems or other techniques described above) can be performed during a recycling process or prior to a recycling process, such by entering the data when a new blade is put into service on a wind turbine. Maintenance data also can be entered in such forms. Maintenance data can be helpful for determining the expected lifetime of a blade, or other characteristics.

A wind farm interface also may include functionality (e.g., presented in a browser or a standalone application) for generating forms such as customs or certification forms, as described above. The operator can choose a form to generate and enter or import any details to complete that form. If the wind farm interface allows communication with the recipient of such forms (e.g., with a certification agency that receives certificates of destruction), the wind farm interface may include an interface and functionality for electronically transmitting forms. Other possible options include saving and printing forms for signature.

A wind farm interface also may include one or more views to present data that may be useful for planning purposes. For example, the interface may include a summary screen with data about the wind farm as a whole, in which the operator can see what blades will need to be replaced soon, blades being transported to the farm (e.g., when new blades are to be put into service) or from the farm (e.g., as part of a recycling process), cost estimates, or other information.

A blade manufacturer interface may include forms and views oriented to blade manufacturers. For example, a blade manufacturer interface may include a form (e.g., presented in a browser or a standalone application) that allows a blade manufacturer to select a wind farm operator and select information for one or more specific blades to view. As another example, a blade manufacturer interface may include a blade information screen that allows the blade manufacturer to view relevant information at an individual blade, turbine, or wind farm level so that the blade manufacturer can plan production accordingly.

A system manager interface may include forms and views oriented to system managers. For example, a system manager interface may include a form (e.g., presented in a browser or a standalone application) that allows the system manager to select a wind farm, blade, blade manufacturer, or any other level of data that they may want to view or manipulate. Data of various types and levels of detail may be accessed or modified through different forms, or forms that allow access or modification of combination of different types and levels of detail. As another example, a system manager interface may include one or more screens to view the data of individual windfarms, subsets of windfarms, or all wind farms managed by the system. Such views may be useful to allow for planning, management, and tracking of recycling efforts. As another example, a system manager interface also may include a form to allow the system manager to manipulate the data for wind farms (e.g., via data filtering or other processing, or correction of errors reported by customers) so that the system manager can provide technical support to wind farm operators.

FIGS. 8-16 are screenshot diagrams depicting illustrative features of user interfaces for viewing and filtering data according to some embodiments.

Figure 8:
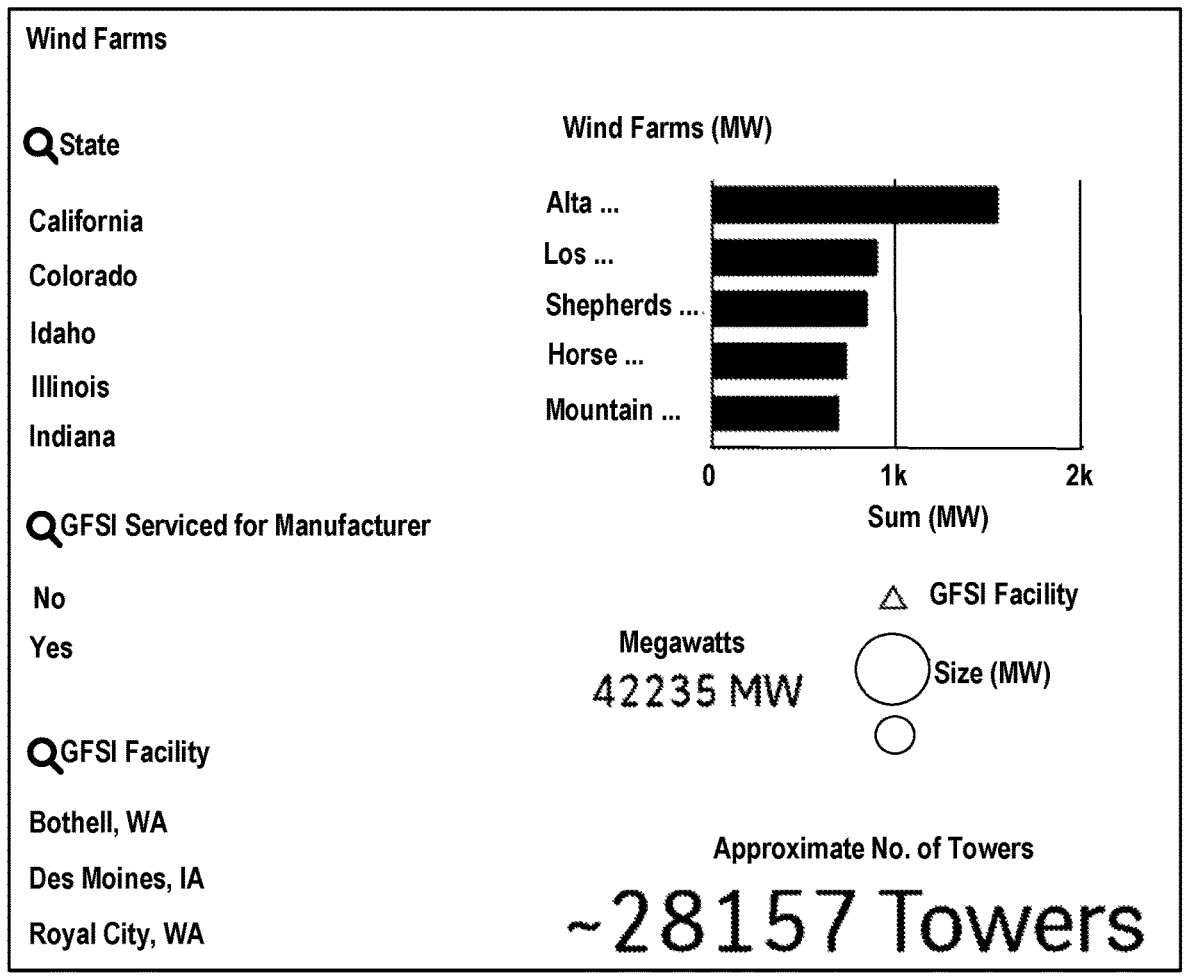

FIGS. 8 and 10 depict illustrative interfaces in which information related to U.S. wind farms (e.g., megawatts, location) and recycling facilities is displayed. In such interfaces, filters can be applied and graphical elements can be manipulated to zoom, filter, or modify the data or the display of the data in various ways.

FIG. 9 is a screenshot diagram depicting an example of how the interface of FIG. 8 may be transformed after such filtering. In FIG. 9, a filter has been applied to only show a specific data set, the Callahan Divide Wind Farm.

Figure 12:
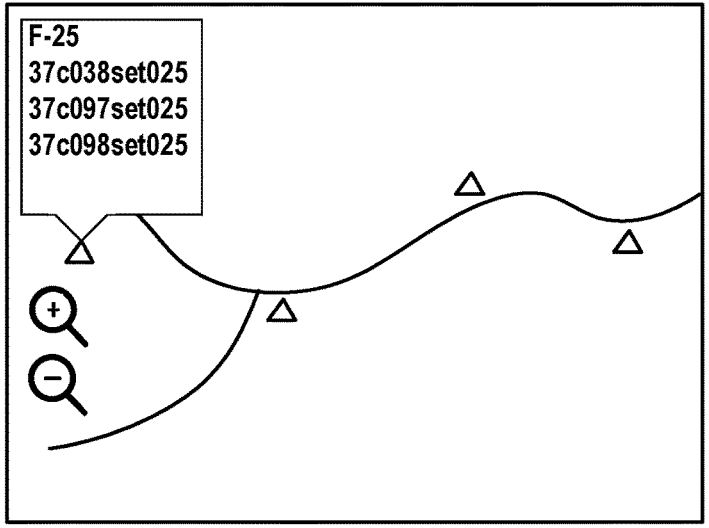

FIG. 11 is a screenshot diagram depicting a close-up view of the Callahan Divide Wind Farm. Close-up views can be generated by, e.g., activating the zoom-in icon depicted in the map portion of FIG. 9. (Zoomed-out views can be generated in a similar manner with the zoom-out icon.) Data related to the turbines of the windfarm is illustrated graphically on the map portion and in table form with specific details related to recycling blades from the turbines. The table includes information such as blade serial number; tower/turbine number; date "cut" (e.g., the date the blade was removed from the turbine); date moved to a processing facility (e.g., for sectioning, crushing, and grinding); and status of the recycling process for each blades. FIG. 12 is a further close-up of the wind farm of FIG. 11, with individual towers shown. In this example, a tower (F-25) has been selected, and serial numbers of the three blades thereon are displayed.

Figure 13:
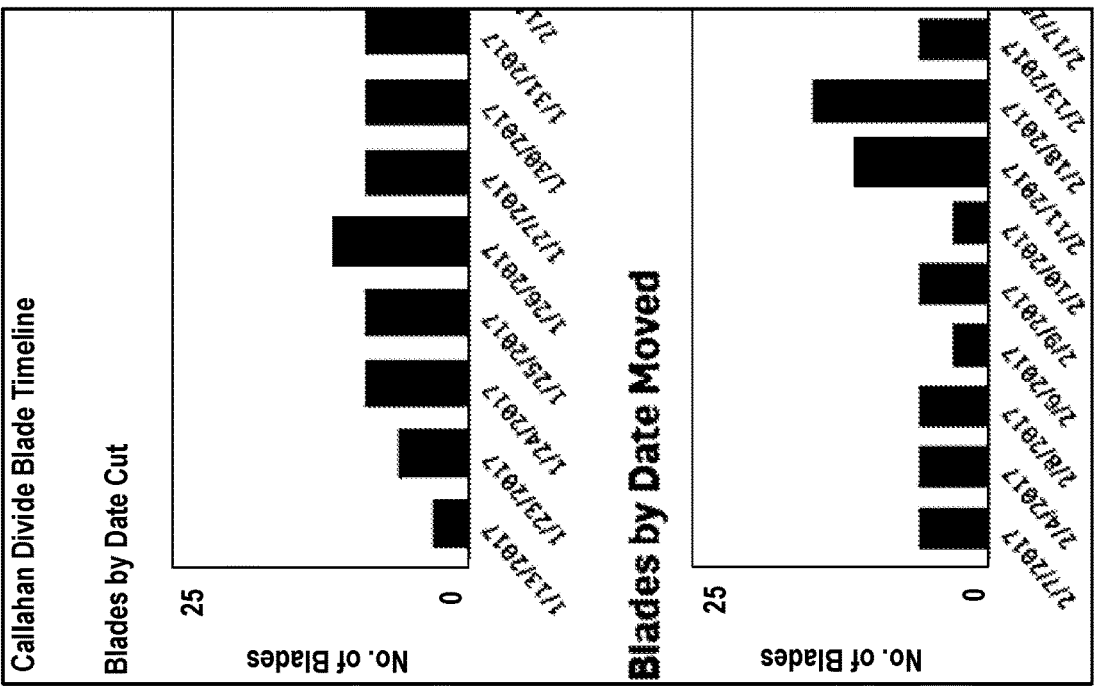
Figure 14:
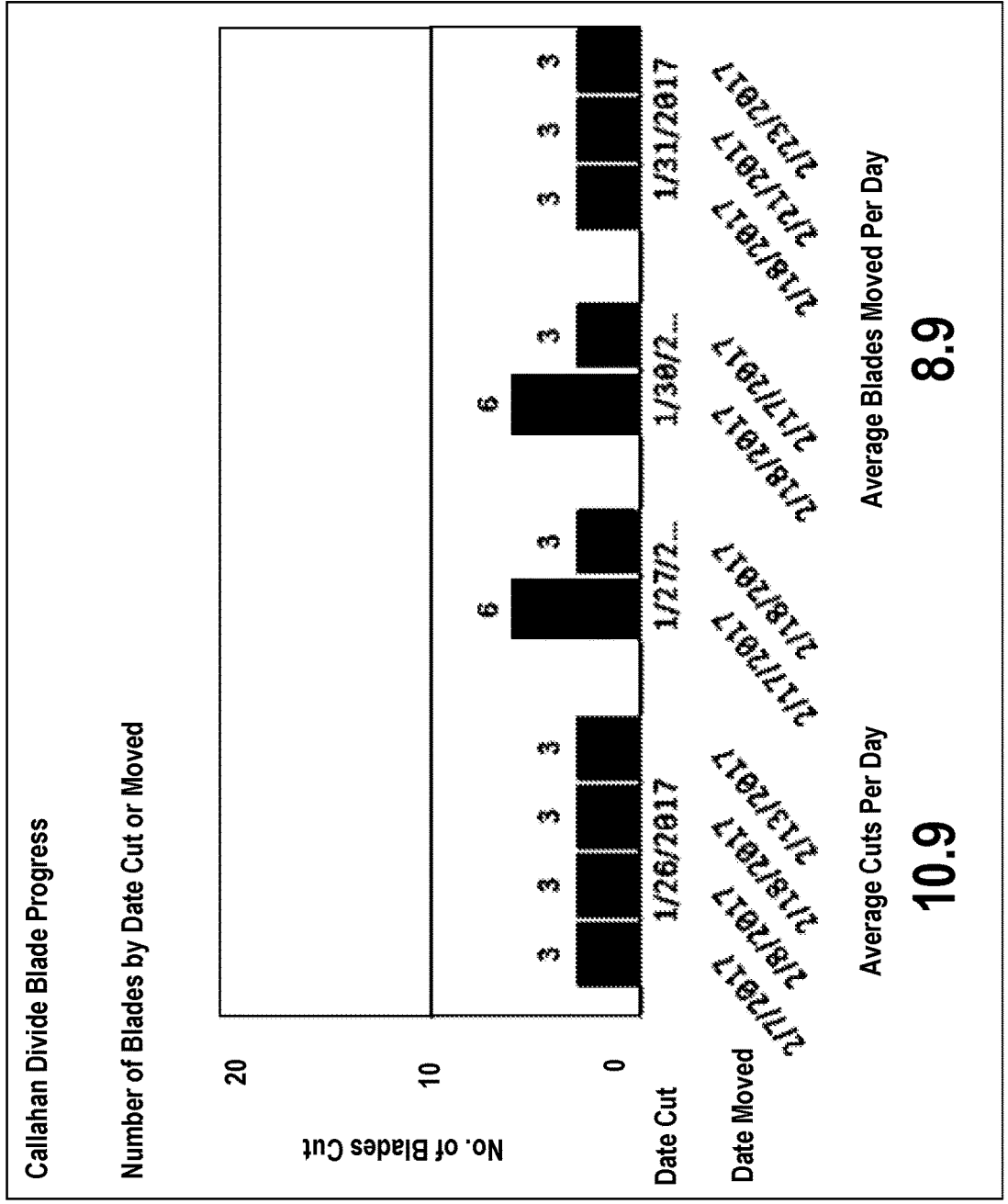

FIGS. 13 and 14 illustrate an illustrative data visualizations of Callahan Divide Wind Farm blades, such as the dates blades are cut or moved, and the processing time (or average times) for each step. These views can allow users to, e.g., determine points in time where processing improvements or bottlenecks occur. The "Moved Date" portion of FIG. 13 allows a user to select a particular window of time (represented by a box on the timeline) for detailed viewing.

FIG. 15 illustrates an exemplary decommissioning certificate generated by the system upon completion of a set of required steps in the process. The towers and specific blades subject to the certificate are listed.

In described embodiments, the software system can be integrated with new or existing customer relationship management (CRM) software for additional functionality. The Salesforce platform, provided by Salesforce.com, Inc., is an example of CRM software compatible with the present software, but it will be appreciated that any CRM software can be integrated with the blade recycling software presently disclosed.

Integration with CRM software allows for customers' data to be automatically interfaced with the blade recycling software to populate the database(s) disclosed herein. Such data can then be used for visualization of customers' products and aspects related to blade lifecycle. For example, CRM software can be used to populate the blade recycling software with identification numbers, geographic location, date of installation, etc., such that a customer can then visualize and analyze the locations of their blades as well as the age and the urgency of replacement of blades.

FIG. 16 depicts a user interface with illustrative results of CRM integrations, pulling data from a CRM database to provide additional information for visualization. Here, the data provides insight into wind farm age for an illustrative set of wind farms in the U.S. As with other examples described above, the data depicted in FIG. 16 can be filtered in various ways, such as by selecting a threshold age (e.g., 10 years) to locate wind farms that will likely need replacement blades in the near future.

Many alternatives to the user interfaces described herein are possible. For example, Screens such as those depicted in FIGS. 8-16 also can be modified to present other information, filtering, or views. For example, in a worldwide view, each country or region can be explored to obtain more detailed data. Individual countries can be selected and a rough estimate of the wind-power generation capacity for that country can be illustrated, similar to selection of Texas in FIG. 9. As another example, as was done in the transition from FIG. 8 to FIG. 10 (illustrating a particular wind farm), zoom-in, zoom-out, or other operation can be used to analyze data in other countries.

In practice, the user interfaces described herein may be implemented as separate user interfaces or as different states of the same user interface, and the different states can be presented in response to different events, e.g., user input events. The user interfaces can be customized for different devices, input and output capabilities, and preferences. For example, the user interfaces can be presented in different ways depending on display size, display orientation, whether the device is a mobile device, etc. The information and user interface elements shown in the user interfaces can be modified, supplemented, or replaced with other elements in various possible implementations. For example, various combinations of graphical user interface elements including text boxes, sliders, drop-down menus, radio buttons, soft buttons, etc., or any other user interface elements, including hardware elements such as buttons, switches, scroll wheels, microphones, cameras, etc., may be used to accept user input in various forms. As another example, the user interface elements that are used in a particular implementation or configuration may depend on whether a device has particular input and/or output capabilities (e.g., a touchscreen). Information and user interface elements can be presented in different spatial, logical, and temporal arrangements in various possible implementations. For example, information or user interface elements depicted as being presented simultaneously on a single page or tab may also be presented at different times, on different pages or tabs, etc. As another example, some information or user interface elements may be presented conditionally depending on previous input, user preferences, or the like.

Illustrative Computing Devices and Operating Environments

Unless otherwise specified in the context of specific examples, described techniques and tools may be implemented by any suitable computing device or set of devices.

In any of the described examples, a data store contains data as described herein and may be hosted, for example, by a database management system (DBMS) to allow a high level of data throughput between the data store and other components of a described system. The DBMS may also allow the data store to be reliably backed up and to maintain a high level of availability. For example, a data store may be accessed by other system components via a network, such as a private network in the vicinity of the system, a secured transmission channel over the public Internet, a combination of private and public networks, and the like. Instead of or in addition to a DBMS, a data store may include structured data stored as files in a traditional file system. Data stores may reside on computing devices that are part of or separate from components of systems described herein. Separate data stores may be combined into a single data store, or a single data store may be split into two or more separate data stores.

Some of the functionality described herein may be implemented in the context of a client-server relationship. In this context, server devices may include suitable computing devices configured to provide information and/or services described herein. Server devices may include any suitable computing devices, such as dedicated server devices. Server functionality provided by server devices may, in some cases, be provided by software (e.g., virtualized computing instances or application objects) executing on a computing device that is not a dedicated server device. The term "client" can be used to refer to a computing device that obtains information and/or accesses services provided by a server over a communication link. However, the designation of a particular device as a client device does not necessarily require the presence of a server. At various times, a single device may act as a server, a client, or both a server and a client, depending on context and configuration. Actual physical locations of clients and servers are not necessarily important, but the locations can be described as "local" for a client and "remote" for a server to illustrate a common usage scenario in which a client is receiving information provided by a server at a remote location. Alternatively, a peer-to-peer arrangement, or other models, can be used.

Figure 17:
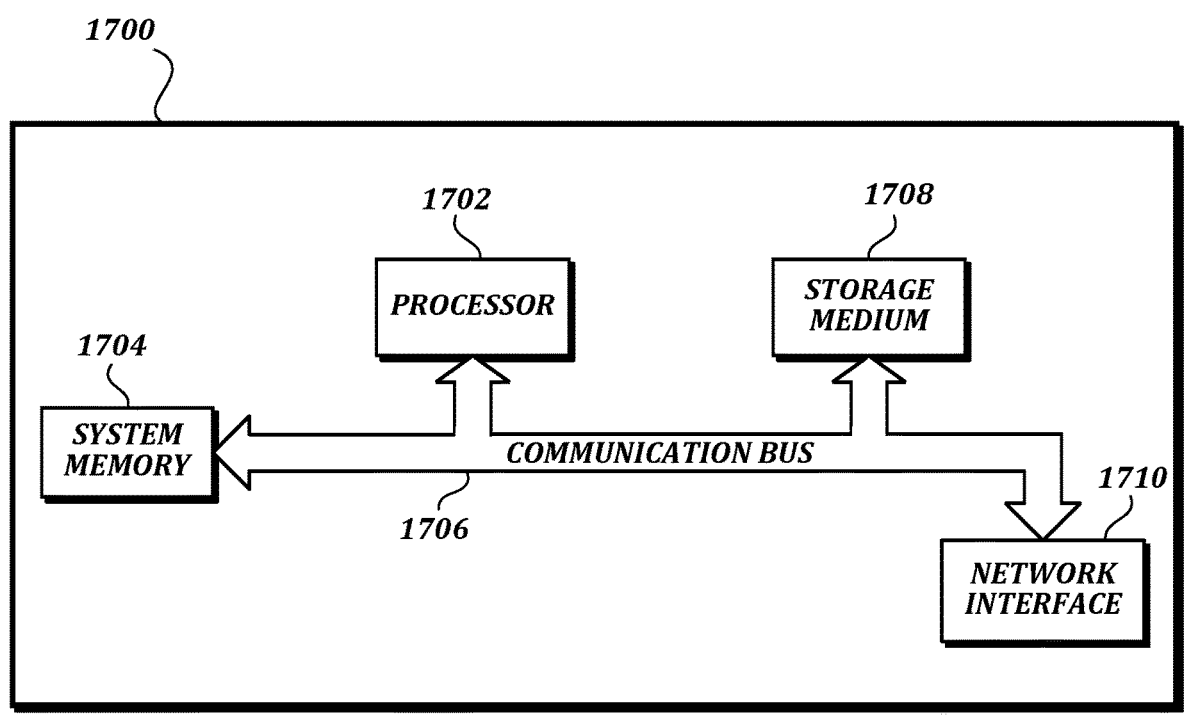
FIG. 17 is a block diagram that illustrates aspects of an illustrative computing device appropriate for use in accordance with embodiments of the present disclosure.

FIG. 17 is a block diagram that illustrates aspects of an illustrative computing device 1700 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 1700 includes at least one processor 1702 and a system memory 1704 connected by a communication bus 1706. Depending on the exact configuration and type of device, the system memory 1704 may be volatile or nonvolatile memory, such as read only memory ("ROM"), random access memory ("RAM"), EEPROM, flash memory, or other memory technology. Those of ordinary skill in the art and others will recognize that system memory 1704 typically stores data and/or program modules that are immediately accessible to and/or currently being operated on by the processor 1702. In this regard, the processor 1702 may serve as a computational center of the computing device 1700 by supporting the execution of instructions.

As further illustrated in FIG. 17, the computing device 1700 may include a network interface 1710 comprising one or more components for communicating with other devices over a network. Embodiments of the present disclosure may access basic services that utilize the network interface 1710 to perform communications using common network protocols. The network interface 1710 may also include a wireless network interface configured to communicate via one or more wireless communication protocols, such as WiFi, 2G, 3G, 4G, LTE, 5G, WiMAX, Bluetooth, and/or the like.

In FIG. 17, the computing device 1700 also includes a storage medium 1708. However, services may be accessed using a computing device that does not include means for persisting data to a local storage medium. Therefore, the storage medium 1708 depicted in FIG. 17 is optional. In any event, the storage medium 1708 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like.

As used herein, the term "computer-readable medium" includes volatile and nonvolatile and removable and nonremovable media implemented in any method or technology capable of storing information, such as computer-readable instructions, data structures, program modules, or other data. In this regard, the system memory 1704 and storage medium 1708 depicted in FIG. 17 are examples of computer-readable media.

For ease of illustration and because it is not important for an understanding of the claimed subject matter, FIG. 17 does not show some of the typical components of many computing devices. In this regard, the computing device 1700 may include input devices, such as a keyboard, keypad, mouse, trackball, microphone, video camera, touchpad, touchscreen, electronic pen, stylus, and/or the like. Such input devices may be coupled to the computing device 1700 by wired or wireless connections including RF, infrared, serial, parallel, Bluetooth, USB, or other suitable connection protocols using wireless or physical connections.

In any of the described examples, input data can be captured by input devices and processed, transmitted, or stored (e.g., for future processing). The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 1700 (e.g., a client device), or can be integral components of the computing device 1700. In some embodiments, multiple input devices may be combined into a single, multifunction input device (e.g., a video camera with an integrated microphone). The computing device 1700 may also include output devices such as a display, speakers, printer, etc. The output devices may include video output devices such as a display or touchscreen. The output devices also may include audio output devices such as external speakers or earphones. The output devices can be separate from and communicatively coupled to the computing device 1700, or can be integral components of the computing device 1700. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Many alternatives to the software systems and related devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A method of recycling wind turbine blades, comprising:
   obtaining a wind turbine blade for recycling;
   scanning a radio-frequency identification (RFID) tag attached to the wind turbine blade to obtain a blade code that uniquely identifies the wind turbine blade within a recycling management database at a remote computer system;
   uploading the blade code to the recycling management database at the remote computer system;
   sectioning the wind turbine blade into two or more sections by cutting the wind turbine blade at one or more intermediate locations along a length of the wind turbine blade;
   transporting the wind turbine blade sections to a feed bin of a crushing machine and conveying the wind turbine blade sections from the feed bin to a rotating crushing drum;
   crushing the wind turbine blade sections in the rotating crushing drum to produce blade pieces;
   conveying the blade pieces to a chute configured to direct the blade pieces into a container;
   loading the blade pieces into the container;
   scanning an RFID tag attached to the container to obtain a container code that uniquely identifies the container within the recycling management database;
   uploading the container code to the recycling management database at the remote computer system and associating the blade code with the container code in the recycling management database, in order to track the wind turbine blade during the method of recycling wind turbine blades; and
   loading the blade pieces into a transportation vessel.

2. The method of claim 1, further comprising:
   transporting the blade pieces to a manufacturing facility;
   unloading the blade pieces at the manufacturing facility;
   manufacturing a product at the manufacturing facility using the blade pieces;
   scanning an RFID tag of the manufactured product to obtain a product code that uniquely identifies the manufactured product within the recycling management database; and
   uploading the product code to the recycling management database at the remote computer system and associating the blade code, the container code, and the product code in the recycling management database, in order to track the wind turbine blade during the method of recycling wind turbine blades.

3. The method of claim 1, wherein the step of loading the blade pieces into the transportation vessel comprises:
   transporting the container to a loading hopper having an auger;
   unloading the blade pieces from the container into the hopper; and
   directing the blade pieces through a conduit with the auger to an outlet at the transportation vessel.

4. The method of claim 1, wherein the step of cutting the wind turbine blade is performed using a cutting tool selected from the group consisting of a wire saw having an endless loop abrasive cable, a circular saw, a grinder, an impact blade, a torch, and a waterjet.

5. The method of claim 1, wherein the blade pieces have a maximum length dimension in the range between 2 inches and 3 inches following the step of crushing.

6. The method of claim 1, wherein the crushing machine includes a mobility system such that the crushing machine is movable to a different position, the mobility system being selected from the group consisting of wheels, continuous tracks, and skids.

7. A method of recycling wind turbine blades, comprising:
   obtaining a wind turbine blade for recycling;
   receiving, via radio-frequency communication with a transmitter attached to the wind turbine blade, a blade code that uniquely identifies the wind turbine blade within a recycling management database at a remote computer system;
   uploading the blade code to the recycling management database at the remote computer system;
   sectioning the wind turbine blade into at least two sections by cutting the wind turbine blade at one or more intermediate locations along a length of the wind turbine blade;
   transporting the at least two wind turbine blade sections to a feed bin of a crushing machine and conveying the at least two wind turbine blade sections from the feed bin to a rotating crushing drum;
   crushing the at least two wind turbine blade sections in the rotating crushing drum to produce blade pieces;
   conveying the blade pieces to a grinding machine configured to break the blade pieces into smaller blade particles;
   grinding the blade pieces to produce the blade particles;
   conveying the blade particles to a chute configured to direct the blade particles into a container;
   loading the blade particles into the container;

receiving, via radio-frequency communication with a transmitter attached to the container, a container code that uniquely identifies the container within the recycling management database;

uploading the container code to the recycling management database at the remote computer system and associating the blade code with the container code in the recycling management database, in order to track the wind turbine blade during the method of recycling wind turbine blades; and loading the blade particles into a transportation vessel.

8. The method of claim 7, further comprising:

transporting the blade particles to a manufacturing facility;

unloading the blade particles at the manufacturing facility;

manufacturing a product at the manufacturing facility using the blade particles;

receiving, via radio-frequency communication, a product code that uniquely identifies the manufactured product within the recycling management database; and uploading the product code to the recycling management database at the remote computer system and associating the blade code, the container code, and the product code in the recycling management database, in order to track the wind turbine blade during the method of recycling wind turbine blades.

9. The method of claim 7, wherein the radio-frequency communication includes communication with an RFID tag.

10. The method of claim 7, wherein the recycling management database is accessible via a user interface at a client device.

11. The method of claim 7, wherein loading the blade particles into the transportation vessel comprises:

transporting the container to a loading hopper having an auger;

unloading the blade particles from the container into the hopper; and directing the blade particles through a conduit with the auger to an outlet at the transportation vessel.

\* \* \* \* \*